US012729508B2

(12) United States Patent
Nickodemus

(10) Patent No.: US 12,729,508 B2
(45) Date of Patent: Sep. 8, 2026

(54) PROTECTIVE SHIELDS

(71) Applicant: Equipment Armor, Inc., Wake Forest, NC (US)

(72) Inventor: Timothy David Nickodemus, Wake Forest, NC (US)

(73) Assignee: EA SAFETY, LLC, Raleigh, NC (US)

(*) Notice: Subject to any disclaimer, the term of this patent is extended or adjusted under 35 U.S.C. 154(b) by 185 days.

(21) Appl. No.: 18/668,469

(22) Filed: May 20, 2024

(65) Prior Publication Data

US 2024/0384505 A1 Nov. 21, 2024

Related U.S. Application Data

(63) Continuation of application No. 17/951,360, filed on Sep. 23, 2022, now Pat. No. 11,993,914, which is a (Continued)

(51) Int. Cl.
*E02F 9/16* (2006.01)
*B32B 3/08* (2006.01)
(Continued)

(52) U.S. Cl.
CPC ................ *E02F 9/163* (2013.01); *B32B 3/08* (2013.01); *B32B 3/28* (2013.01); *B32B 7/12* (2013.01);
(Continued)

(58) Field of Classification Search
CPC ......... B32B 27/08; B32B 27/365; B32B 3/08; B32B 3/28; B32B 7/08; B32B 7/12;
(Continued)

(56) References Cited

U.S. PATENT DOCUMENTS 3,622,440 A 11/1971 Snedeker et al.
3,858,242 A 1/1975 Gooding
(Continued)

FOREIGN PATENT DOCUMENTS

DE 4223538 C1 11/1993
EP 2667143 A1 11/2013
(Continued)

OTHER PUBLICATIONS

Lexan sheet Technical Manual, Sabic Innovative Plastics (Year: 2009).

(Continued)

*Primary Examiner* — Alicia J Weydemeyer
*Assistant Examiner* — Laura B Figg
(74) *Attorney, Agent, or Firm* — K&L Gates LLP

(57) ABSTRACT

Protective shields configured to prevent projection against projectiles, such as during excavating and/or mining operations, are provided. The protective shields include a base layer comprising one or more transparent polycarbonate layers, a sacrificial polycarbonate layer comprising a transparent polycarbonate, and an air gap positioned directly between at least a portion of the base layer and the sacrificial polycarbonate layer. The sacrificial polycarbonate layer is directly or indirectly attached to the base layer in a manner to provide the air gap positioned between the base layer and the sacrificial polycarbonate layer.

27 Claims, 22 Drawing Sheets

Related U.S. Application Data continuation of application No. 15/364,368, filed on Nov. 30, 2016, now Pat. No. 11,486,114.

(60) Provisional application No. 62/260,708, filed on Nov. 30, 2015.

(51) Int. Cl.

| | |
|---|---|
| ***B32B 3/28*** | (2006.01) |
| ***B32B 7/12*** | (2006.01) |
| ***B32B 7/14*** | (2006.01) |
| ***B32B 27/08*** | (2006.01) |
| ***B32B 27/36*** | (2006.01) |
| ***F41H 5/02*** | (2006.01) |
| ***F41H 5/04*** | (2006.01) |
| ***F41H 5/26*** | (2006.01) |

(52) U.S. Cl.

CPC ................ *B32B 7/14* (2013.01); *B32B 27/08* (2013.01); *B32B 27/365* (2013.01); *F41H 5/023* (2013.01); *F41H 5/0407* (2013.01); *F41H 5/263* (2013.01); *B32B 2250/02* (2013.01); *B32B 2250/04* (2013.01); *B32B 2250/244* (2013.01); *B32B 2307/412* (2013.01); *B32B 2307/50* (2013.01); *B32B 2307/51* (2013.01); *B32B 2307/71* (2013.01); *B32B 2307/7242* (2013.01); *B32B 2307/7265* (2013.01); *B32B 2307/732* (2013.01); *B32B 2307/748* (2013.01); *B32B 2307/756* (2013.01); *B32B 2571/00* (2013.01); *B32B 2605/006* (2013.01)

(58) Field of Classification Search

CPC ... B32B 7/14; B32B 2250/02; B32B 2250/04; B32B 2250/244; B32B 2307/412; B32B 2307/50; B32B 2307/51; B32B 2307/71; B32B 2307/7242; B32B 2307/7265; B32B 2307/732; B32B 2307/748; B32B 2307/756; B32B 2571/00; B32B 2605/006; E02F 9/163; F41H 1/00; F41H 5/08; F41H 5/0407

See application file for complete search history.

(56) References Cited

U.S. PATENT DOCUMENTS

| | | | |
|---|---|---|---|
| 4,752,970 | A | 6/1988 | Arakaki |
| 5,059,467 | A | 10/1991 | Berkovitz |
| 5,413,026 | A | 5/1995 | Madden, Jr. |
| 5,496,598 | A | 3/1996 | Delisle |
| 6,387,477 | B1 | 5/2002 | Ogura |
| 7,520,207 | B1 | 4/2009 | Fuqua |
| 2008/0047208 | A1 | 2/2008 | Soltesiz et al. |
| 2011/0072961 | A1 | 3/2011 | Jungkuist |

FOREIGN PATENT DOCUMENTS

| | | | |
|---|---|---|---|
| WO | 1997007377 | A2 | 2/1997 |
| WO | 1997007377 | A3 | 2/1997 |
| WO | 2016123632 | A1 | 8/2016 |
| WO | 2016123632 | A8 | 8/2016 |

OTHER PUBLICATIONS

PalSun Monolythic Polycarbonate Sheets Tech Breif, Palram (Year: 2012).

Hydrosight "Acrylic Vs. Polycarbonate: A Quantitative and Qualitative Comparison" (Year: 2013).

Dynex Extrusions Ltd., Product Catalogue, Nov. 2013, Retrieved from the Internet: <URL: http://dynex.co.nz/wp-content/uploads/2016/06/1026DX_Catalogue_November_2013.pdf>, pp. 1, 4, and 16.

International Search Report and Written Opinion of corresponding International Application No. PCT/US2016/064077 mailed Feb. 28, 2017, all enclosed pages cited.

Extended search report of corresponding European application No. 16871376.6 mailed Jul. 22, 2019, all enclosed pages cited.

Wikipedia entry "Hinge" subheading "Barrel Hinge" retrieved Aug. 16, 2020 (Year: 2020).

Communication pursuant to Article 94(3) EPC in corresponding European application No. 16871376.6 mailed Apr. 16, 2020, all enclosed pages cited.

PROTECTIVE SHIELDS

PRIORITY CLAIM

This application claims priority under 35 U.S.C. § 119(e) to U.S. Provisional Application Ser. No. 62/260,708, filed on Nov. 30, 2015, which is expressly incorporated by reference herein in its entirety.

TECHNICAL FIELD

The invention relates generally to protective shields configured for resisting and/or preventing complete penetration of flying debris from, for example, mining and/or excavating operations.

BACKGROUND

There currently exists an unsafe situation in the heavy construction/mining industries as it relates to the use of, for example, a hydraulic breaker/hammer on a vehicle, such as excavator. For instance, both the manufacturers of hydraulic hammers and those who sell bits/hammer points state that there is a need for a protective shield to be mounted on the excavator before the hammer can be used safely. Operation of a hydraulic hammer or the like, for example, can generate flying debris (e.g., chunks of rock, shared pieces from the bits/hammer points, etc.). The flying debris from such exemplary operations can create a serious or fatal injury. However, neither the hydraulic hammer manufactures, bit/point manufacturers, nor the excavator manufacturers specify the type of shield and/or how any such shield should be mounted on the machine.

In a recent occurrence, the metal from a hammer bit sheared and pierced a 0.25 inch Lexan® sheet, and continued through the windshield of the excavator, and out the back glass. The sheared metal from the hammer bit, after passing through the excavator, landed roughly 60 yards behind the machine. FIG. 1, for instance, shows the projectile sheared off from the hammer bit during operation. FIG. 2 shows that hole punched completely through a 0.25' Lexan® sheet positioned in front of the windshield of an excavator. FIG. 3 shows both the hole formed through the 0.25' Lexan® sheet and a hole formed through the windshield of the excavator from the perspective from within an operator's area/cabin or control compartment. FIG. 4 illustrates a hole formed through the glass on the backside of the operator's area/cabin or control compartment. In this regard, the projectile of FIG. 1 punctured and passed through the 0.25' Lexan® sheet and the windshield of the excavator entering the operator's area/cabin or control compartment, and punctured and passed through the glass on the backside of the operator's area/cabin or control compartment.

Therefore, there at least remains a need in the art for a protective shield that can withstand or prevent complete penetration of projectiles produced during routine excavating operations, such as flying rocks and occasionally sheared metal bits from working implements attached to a working machine (e.g., an excavator or the like). Additionally, there remains a need in the art for a protective shield that can be releasably mounted to a variety of different machines that may need a protective shield to mitigate operator injury due to flying debris.

SUMMARY OF INVENTION

One or more embodiments of the invention may address one or more of the aforementioned problems. Certain embodiments, according to the invention, comprise protective shields configured for preventing or mitigating the complete penetration of flying debris produced, for example, from mining and/or excavating operations. In accordance with certain embodiments of the invention, the protective shield includes a base layer comprising one or more transparent polycarbonate layers, a sacrificial polycarbonate layer comprising a transparent polycarbonate, and an air gap positioned directly between at least a portion of the base layer and the sacrificial polycarbonate layer. The base layer, for example, may comprise a single-layered base layer (e.g., one individual layer) or a laminate base layer (e.g., two or more individual polycarbonate layers laminated together). In accordance with certain embodiments of the invention, each polycarbonate layer (e.g., single-layered base layer, individual polycarbonate layers forming a laminate base layer, and the sacrificial polycarbonate layer) includes a respective ripple orientation and each respective ripple orientation may be oriented in the same direction. In accordance with certain embodiments of the invention, the protective shield comprises (i) a laminate base layer (e.g., a transparent polycarbonate laminate of a plurality of individual polycarbonate layers) or a single-layered base layer (e.g., a transparent polycarbonate layer) and (ii) a sacrificial polycarbonate layer, in which the sacrificial polycarbonate layer may be directly or indirectly attached to, for example, a first outer base layer of the laminate base layer or the single-layered base layer. The sacrificial polycarbonate layer may be positioned between the laminate base layer (or the single-layered base layer) and a working area from with flying debris may be generated. In accordance with certain embodiments of the invention, the laminate base layer may comprise at least two (e.g., three, four, or more) individual transparent polycarbonate layers that have been laminated together. In certain embodiments of the invention, the laminate base layer may include a first outer base layer, a second outer base layer, and an interior base layer, in which these three layers each comprise a transparent polycarbonate layer or sheet and have been laminated together to form the laminate base layer (e.g., a three-layered laminate). In accordance with certain embodiments of the invention, the laminate base layer may comprise a two-layered laminate including, for example, the first and second outer base layers. In accordance with certain embodiments of the invention, the sacrificial polycarbonate layer may comprise a transparent polycarbonate. Each of the individual layers of the laminate base layer (e.g., the first outer base layer, the second outer base layer, and the interior base layer) and the sacrificial polycarbonate layer has a ripple orientation (e.g., the direction of the flow of the monolithic pour when formation of the individual polycarbonate layers). In accordance with certain embodiments, the ripple orientation of every individual polycarbonate layer of the protective shield is the same. In accordance with certain embodiments of the invention, for example, the first outer base layer may have a first ripple orientation, the second outer base layer may have a second ripple orientation, the interior base layer may have a third ripple orientation, and the sacrificial polycarbonate layer may have a fourth ripple orientation, in which the first ripple orientation, the second ripple orientation, the third ripple orientation, and the fourth ripple orientation are the same (e.g., formed or oriented in the same direction). In this regard, the ripple orientation or ripple lines of all polycarbonate layers, in accordance with certain embodiments of the invention, may be oriented or formed in the same direction such that a ripple orientation of one polycarbonate layer does not cross the ripple orientation or ripple line of any of the other polycarbonate layers.

In another aspect, the invention provides a vehicle comprising an operating area (e.g., a control cabin) configured for an individual to operate the vehicle and a protective shield according to certain protective shield embodiments as disclosed herein. In accordance with certain embodiments of the invention, the protective shield may be releasably mounted on the vehicle. In accordance with certain embodiments, the protective shield may be positioned between the operating area and a working area (e.g., an area in which excavating occurs, which may generate flying debris). In this regard, the protective shield can be mounted to a vehicle (e.g., an excavator, a loader, a skid steer, or the like) prior to operation of the vehicle and can be removed after one or more occurrences of operation. Protective shields, in accordance with certain embodiments of the invention, may also be used in front of stationary hydraulic hammers and in the metal sheering industry to protect individuals and/or other equipment.

In yet another aspect, the invention provides a method of forming a protective shield. In accordance with certain embodiments of the invention, the method of forming a protective shield may comprise providing a base layer comprising one or more transparent polycarbonate layers, providing a sacrificial polycarbonate layer comprising a transparent polycarbonate, and directly or indirectly attaching the sacrificial polycarbonate layer to the base layer to define an air gap positioned between at least a portion of the base layer and the sacrificial polycarbonate layer. The base layer, for example, may comprise a single-layered base layer (e.g., one individual layer) or a laminate base layer (e.g., two or more individual polycarbonate layers laminated together). In accordance with certain embodiments of the invention, each polycarbonate layer (e.g., single-layered base layer, individual polycarbonate layers forming a laminate base layer, and the sacrificial polycarbonate layer) includes a respective ripple orientation and each respective ripple orientation may be oriented in the same direction. In accordance with certain embodiments of the invention, the method of forming a protective shield may comprise a step of providing a laminate base layer (or single-layered base layer), in which the laminate base layer may comprise at least two or three individual transparent polycarbonate layers including a first outer base layer having a first ripple orientation, a second outer base layer having a second ripple orientation, and an interior base layer having a third ripple orientation (for three-layered laminate embodiments). In accordance with certain embodiments of the invention, the first ripple orientation, the second ripple orientation, and the third ripple orientation are oriented or formed in the same direction. The method may also include a step of providing a sacrificial polycarbonate layer comprising a transparent polycarbonate and having a fourth ripple orientation. In accordance with certain embodiments of the invention, for example, the method may also comprise aligning the sacrificial polycarbonate layer with the laminate base layer such that the first ripple orientation, the second ripple orientation, the third ripple orientation, and the fourth ripple orientation are oriented in the same direction. In this regard, the ripple orientation or ripple lines of all polycarbonate layers, in accordance with certain embodiments of the invention, may be oriented or formed in the same direction such that a ripple orientation of one polycarbonate layer does not cross the ripple orientation or ripple line of any of the other polycarbonate layers. In accordance with certain embodiments of the invention, the method of forming a protective shield by also comprise directly or indirectly attaching the sacrificial polycarbonate layer to, for example, the first outer layer or the single-layered base layer (e.g., in which the ripple orientation of the single-layered base layer is formed or oriented in the same direction as the ripple orientation of the sacrificial polycarbonate layer).

Still other objects and features will become apparent from the following detailed description considered in conjunction with the accompanying drawings.

BRIEF DESCRIPTION OF THE DRAWING(S)

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

Figure 8:
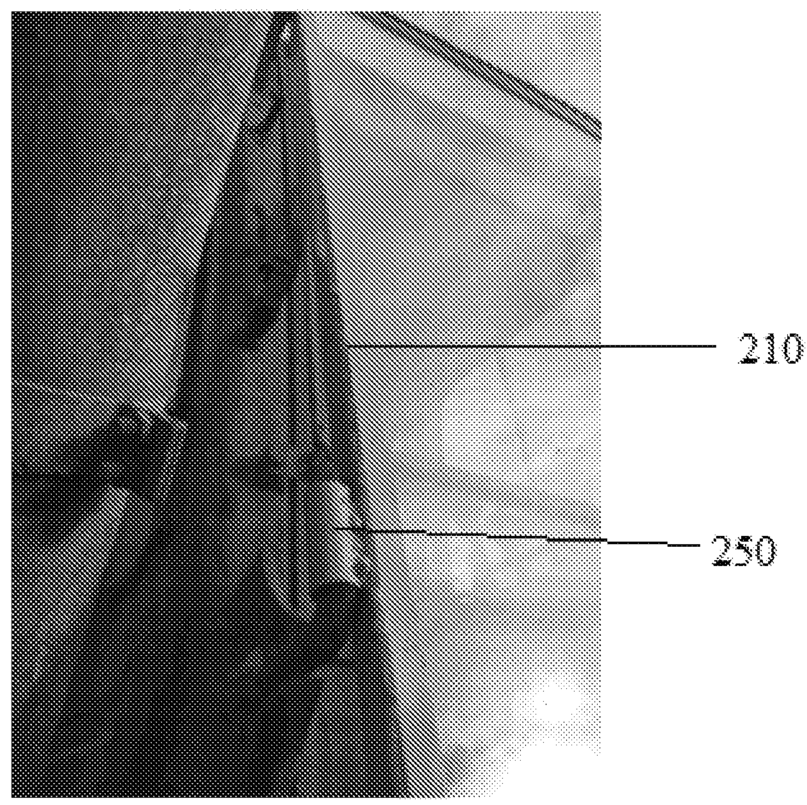
Figure 9:
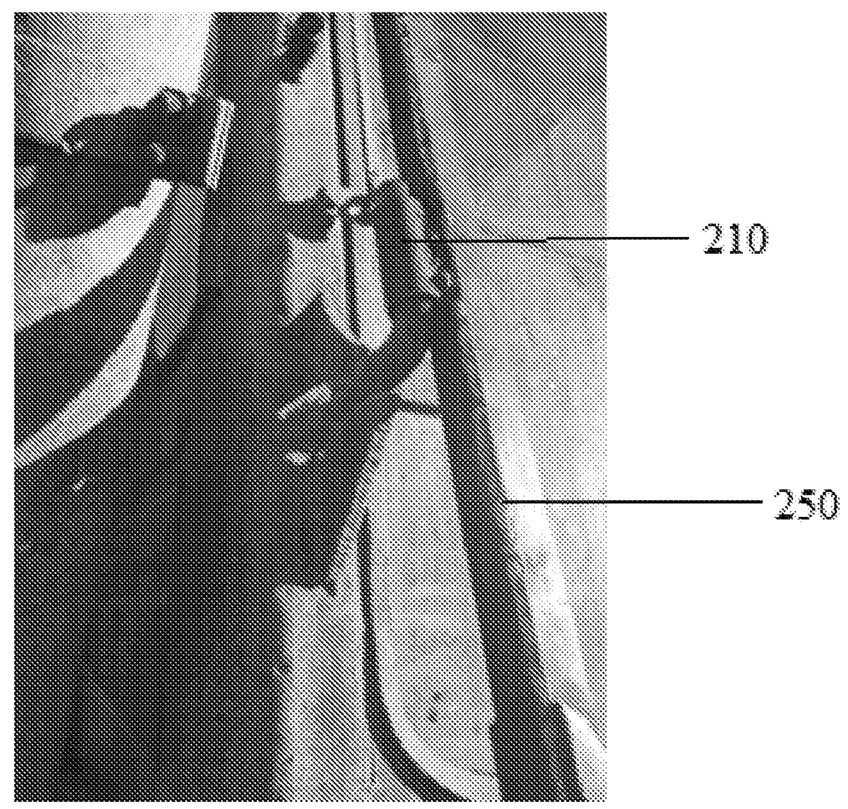
Figure 10:
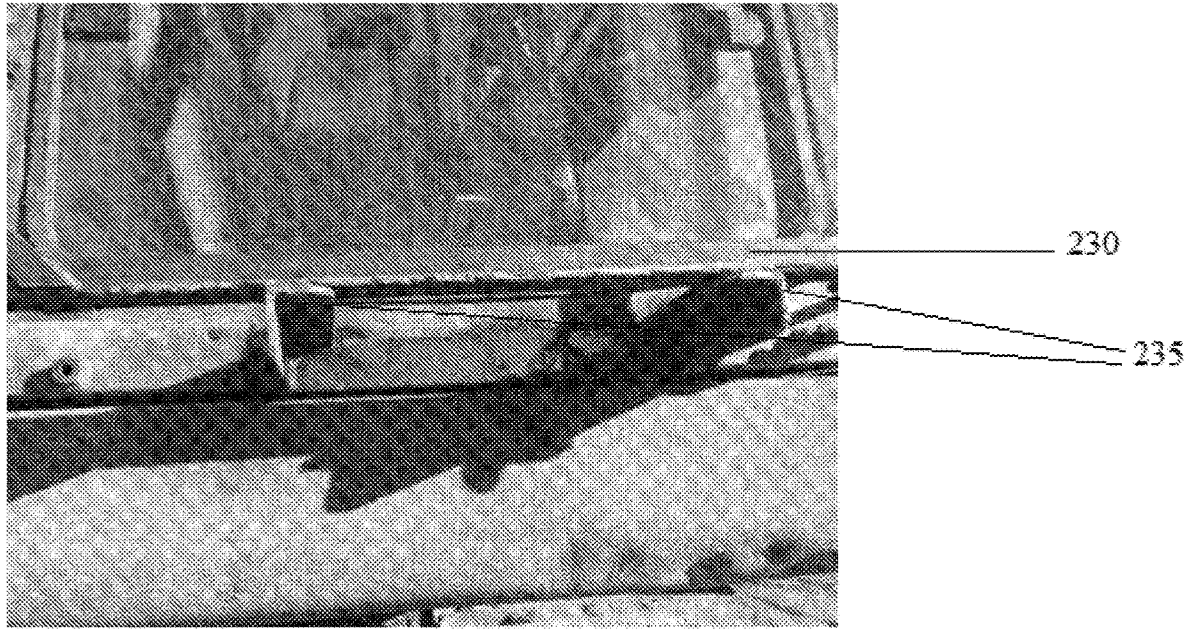
Figure 11:
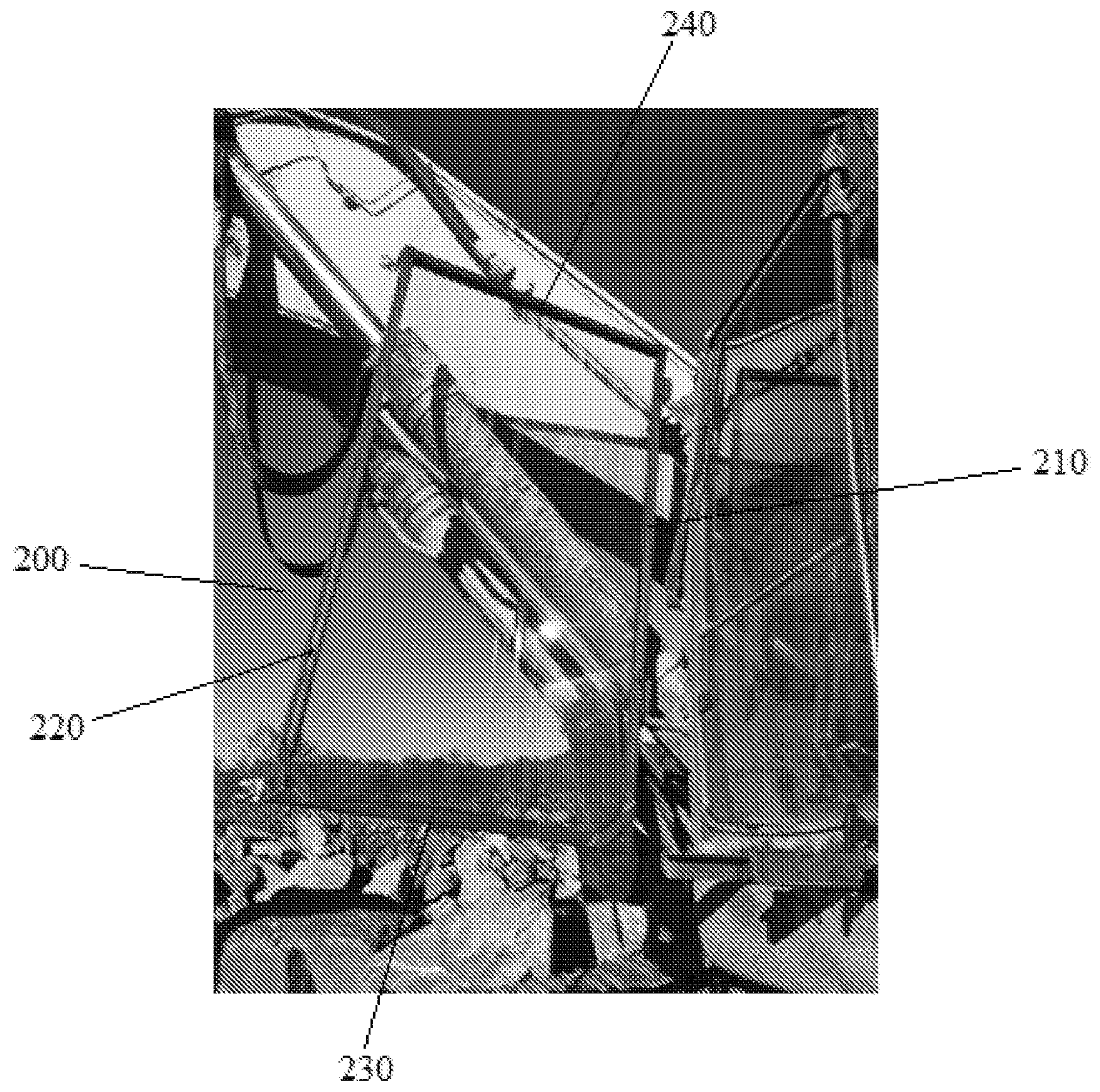
Figure 12:
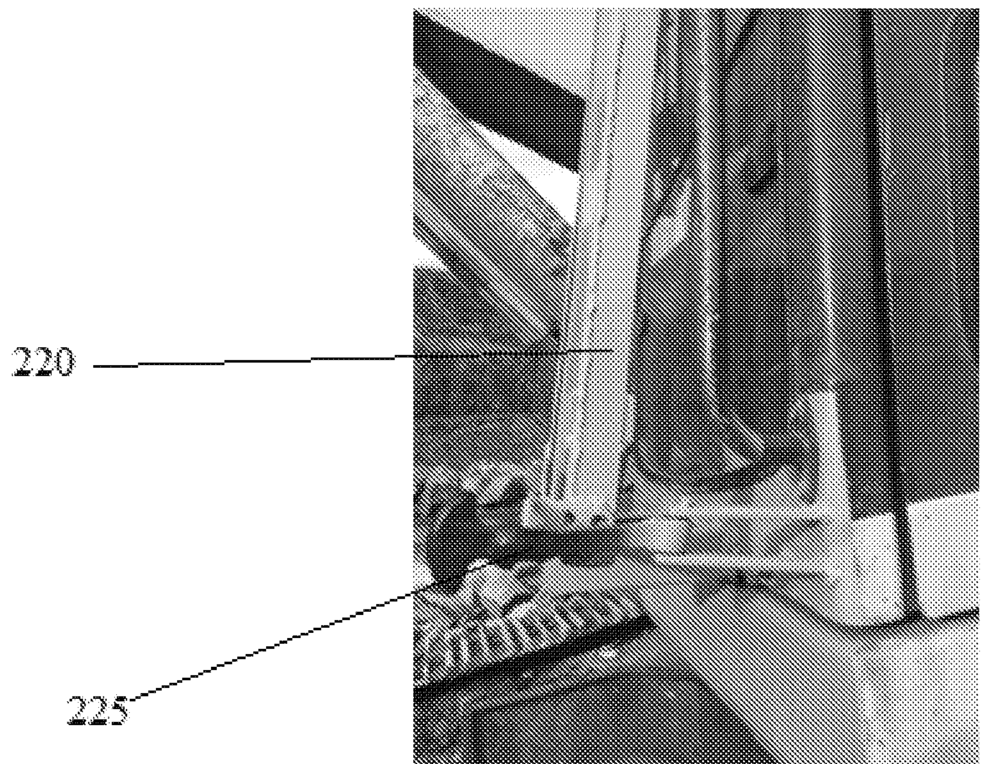
Figure 13:
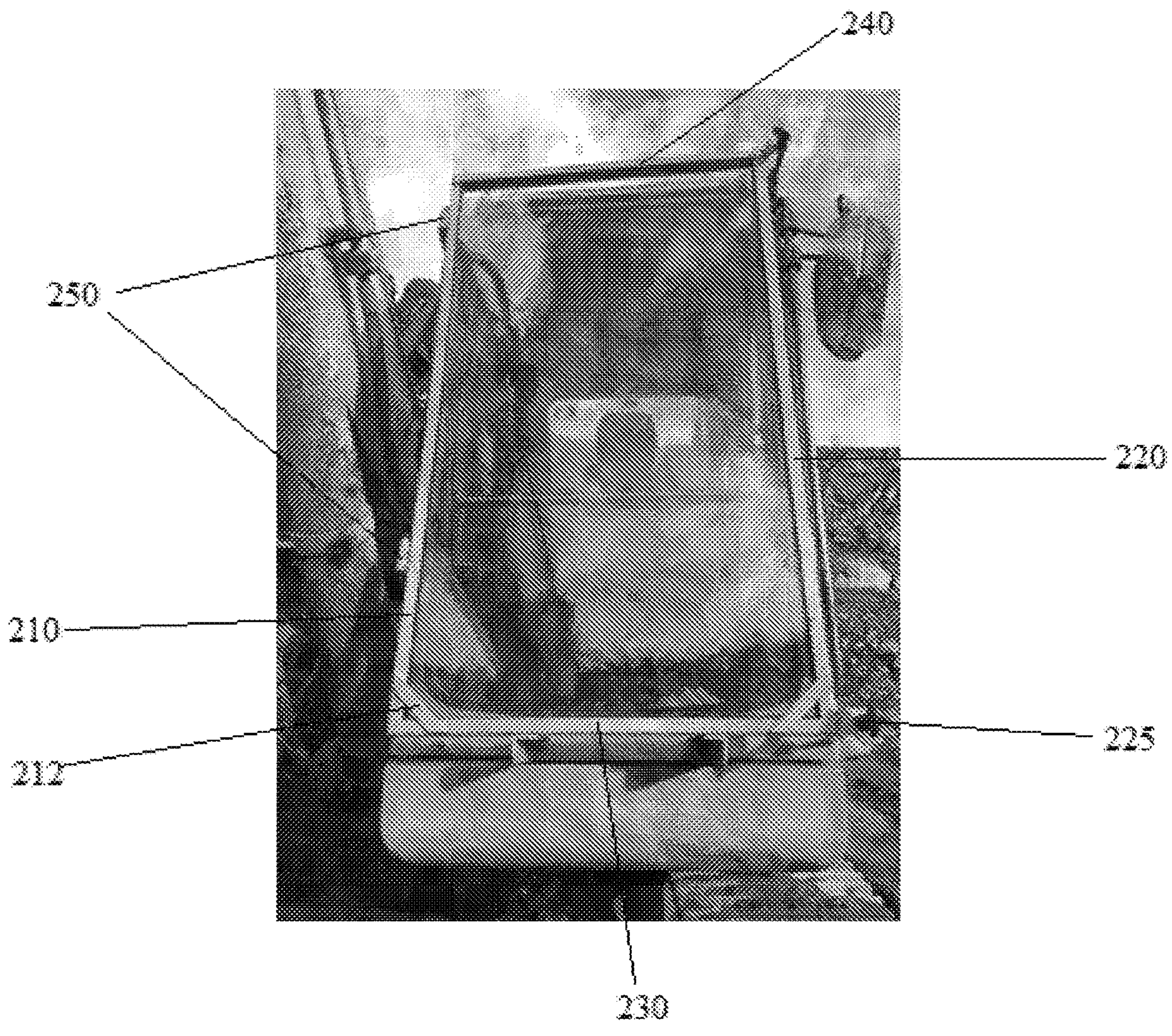

FIGS. 8 and 9 each show a protective shield including a frame, in which the frame includes two barrel hinges that allow for easy mounting to hinge posts that may be welded onto the frame of the machine (e.g. an excavator) according to one embodiment of the invention;

FIG. 10 shows an embodiment of the invention including optional additional supports attached to the base of the machine (e.g., an excavator) to help support the weight of a protective shield in accordance with certain embodiments of the invention;

FIG. 11 shows a protective shield including a frame according to one embodiment of the invention, in which the protective shield is mounted onto a machine and appears in an open position for cleaning;

FIG. 12 shows the protective shield of FIG. 11 in a closed position and overlying the windshield of the machine;

FIG. 13 shows a protective shield is in a closed position and overlying a windshield of an excavator according to one embodiment of the invention.

Figure 14:
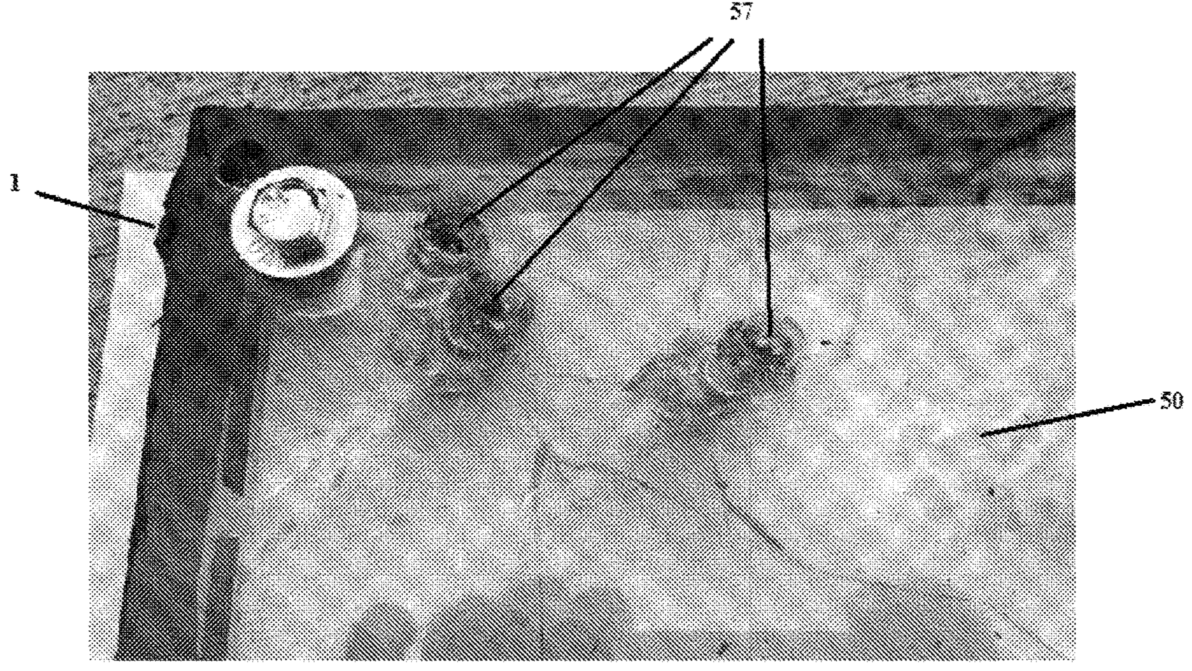
Figure 15:
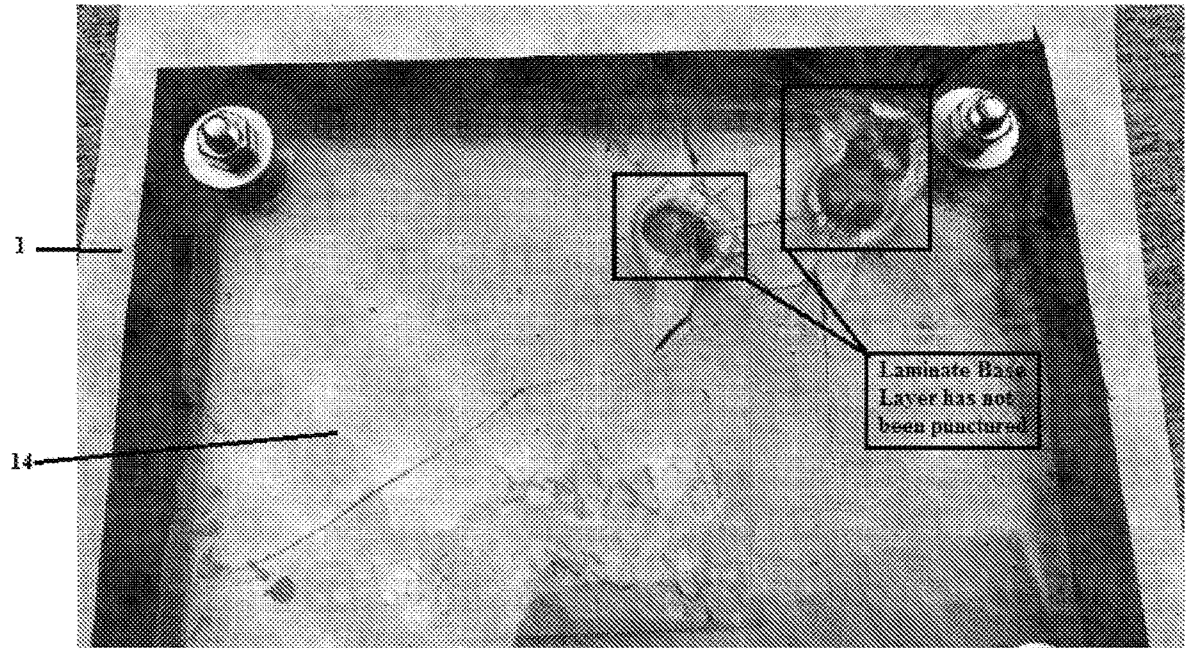
Figure 16:
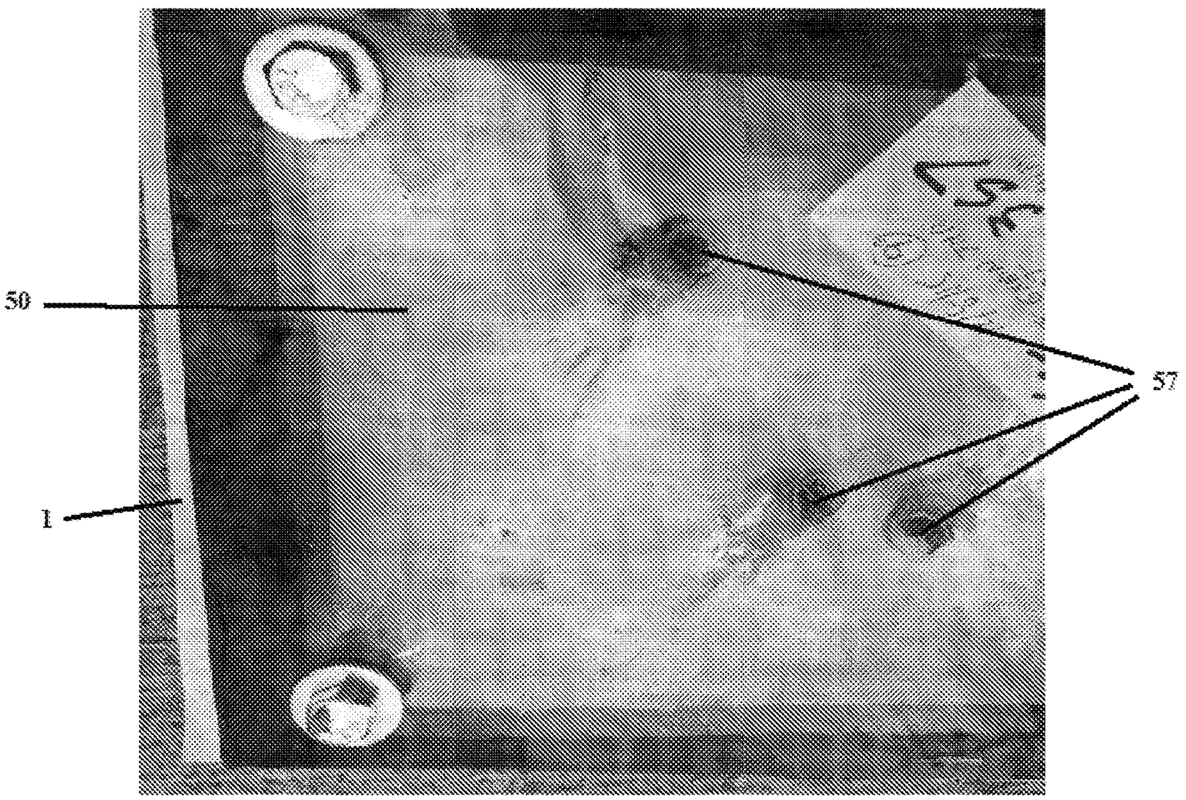
Figure 17:
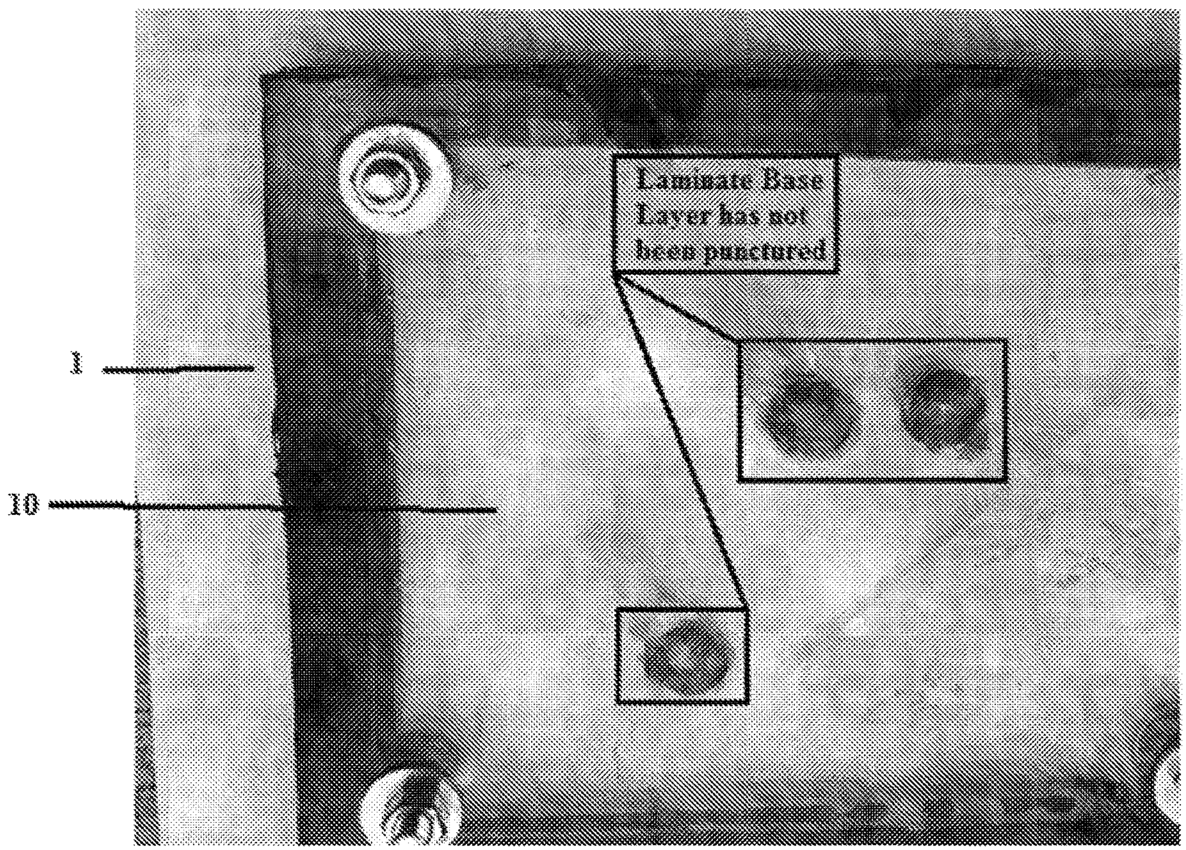
Figure 18:
Figure 19:
Figure 20:
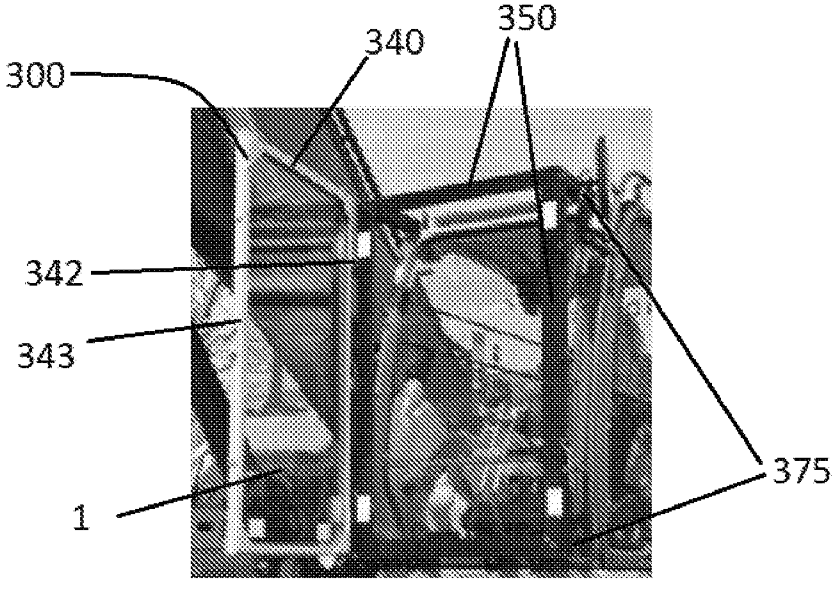
Figure 21:
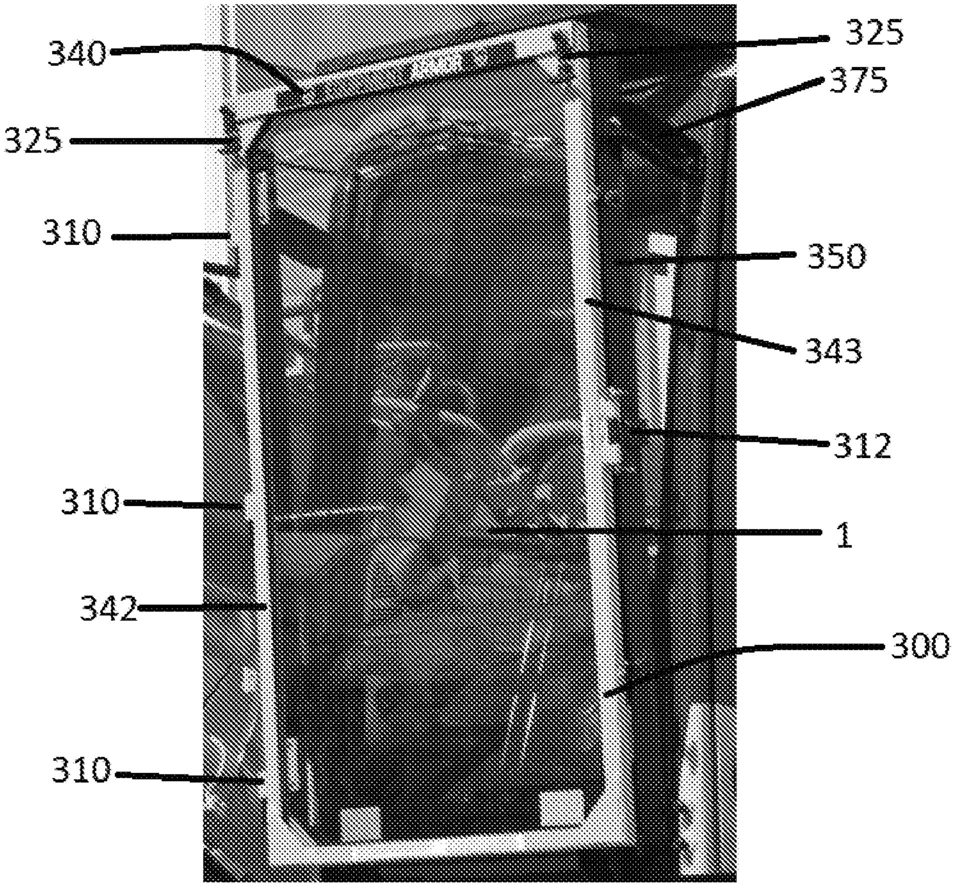
Figure 22:
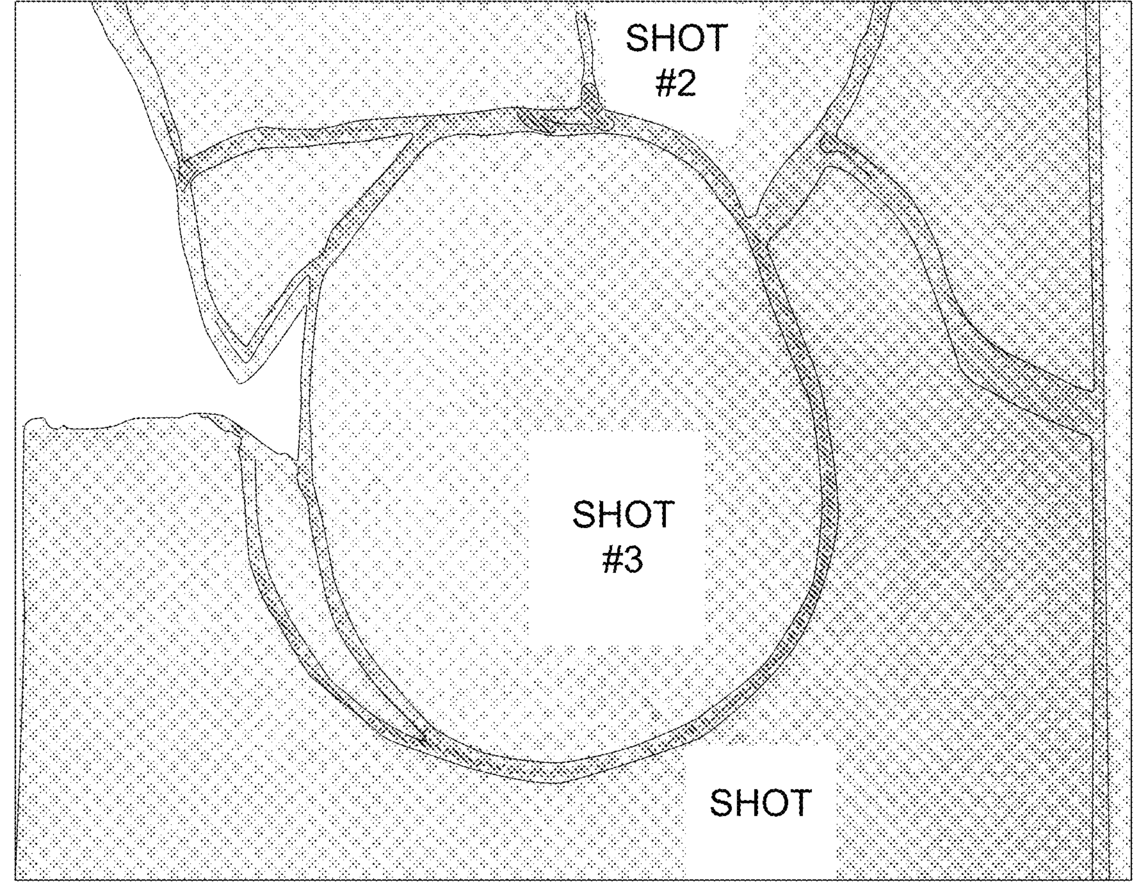

FIG. 14 shows an 8"×10" protective shield having a three-layered laminate base layer, air gap, and single-layered sacrificial polycarbonate layer in accordance with certain embodiments of the invention, in which the protective shield has been subjected to bullet tests;

FIG. 15 shows the backside (i.e., closest layer in view is the second outer base layer) of the protective shield of FIG. 14 and illustrates that the protective shield remains structurally sound after the bullet testing;

FIG. 16 Figure shows an 8"×10" protective shield having a single-layered base layer, air gap, and single-layered sacrificial polycarbonate layer in accordance with certain embodiments of the invention, in which the protective shield has been subjected to bullet tests;

FIG. 17 shows the backside (i.e., closest layer in view is the single-layered base layer) of the protective shield of FIG. 16 and illustrates that the protective shield remains structurally sound after the bullet testing;

FIG. 18 shows a protective shield comprising a ¼" sacrificial polycarbonate layer, a ½" single-layered polycarbonate base layer, and a ¼" air gap, in which the protective shield has been subjected to four (4) different projectile tests at various projectile velocities;

FIG. 19 shows a protective shield comprising a ¼" sacrificial polycarbonate layer, a ½" laminate base layer comprising three individual polycarbonate base layers (i.e., Lexgard® MPC500), and a ¼" air gap, in which the protective shield has been subjected to five (5) different projectile tests at various projectile velocities;

FIG. 20 shows a protective shield in accordance with certain embodiments of the invention housed in a shield-frame and mounted to a vehicle via a sub-frame and mounting brackets, in which the protective shield/shield-frame are in an "opened" position relative to the sub-frame;

FIG. 21 illustrates the embodiment shown in FIG. 20, in which the protective shield/shield-frame are in a "closed" or "operating" position relative to the sub-frame; and FIG. 22 shows a standard sheet of ½" polycarbonate shattered by a projectile fired at sheet at a velocity of 243 miles-per-hour.

DETAILED DESCRIPTION

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

It is to be understood, however, that the drawings are designed solely for purposes of illustration and not as a definition of the limits of the invention, for which reference should be made to the appended claims. Any relative dimensions illustrated in the figures are given by way of example and are not intended to be limiting. As would be appreciated by a person having ordinary skill in the art, the relative dimensions can vary depending on any number of factors including, without limitation, the intended use and performance of the illustrated article.

The invention includes, in accordance with certain embodiments of the invention, a protective shield includes a base layer comprising one or more transparent polycarbonate layers, a sacrificial polycarbonate layer comprising a transparent polycarbonate, and an air gap positioned directly between at least a portion of the base layer and the sacrificial polycarbonate layer. The base layer, for example, may comprise a single-layered base layer (e.g., one individual layer) or a laminate base layer (e.g., two or more individual polycarbonate layers laminated together). In accordance with certain embodiments of the invention, each polycarbonate layer (e.g., single-layered base layer, individual polycarbonate layers forming a laminate base layer, and the sacrificial polycarbonate layer) includes a respective ripple orientation and each respective ripple orientation may be oriented in the same direction. In accordance with certain embodiments, a protective shield may comprise (i) a laminate base layer (e.g., a multi-layered polycarbonate laminate) or a single-layered polycarbonate base layer and (ii) a sacrificial polycarbonate layer, in which the sacrificial polycarbonate layer may be directly or indirectly attached to, for example, a first outer base layer of the laminate base layer to form a single unit. The sacrificial polycarbonate layer may be positioned between the laminate base layer (or single-layered polycarbonate base layer) and a working area from with flying debris may be generated. In accordance with certain embodiments of the invention, the laminate base layer may comprise at least two (e.g., three, four, or more) individual transparent polycarbonate layers that have been laminated together. In certain embodiments of the invention, the laminate base layer may include a first outer base layer, a second outer base layer, and an interior base layer, in which these three layers each comprise a transparent polycarbonate layer or sheet and have been laminated together of form the laminate base layer (e.g., a three-layered laminate). In accordance with certain embodiments, the laminate base layer may comprise a two-layered laminate base layer including the first and second outer base layers laminated together, without an interior base layer. In accordance with certain embodiments of the invention, the sacrificial polycarbonate layer may comprise a transparent polycarbonate. Each of the individual layers of the laminate base layer (e.g., the first outer base layer, the second outer base layer, and the interior base layer) and the sacrificial polycarbonate layer has a ripple orientation (e.g., the direction of the flow of the monolithic pour when formation of the individual polycarbonate layers). In accordance with certain embodiments, the ripple orientation of every individual polycarbonate layer of the protective shield is the same. In accordance with certain embodiments of the invention, for example, the first outer base layer may have a first ripple orientation, the second outer base layer may have a second ripple orientation, the interior base layer may have a third ripple orientation, and the sacrificial polycarbonate layer may have a fourth ripple orientation, in which the first ripple orientation, the second ripple orientation, the third ripple orientation, and the fourth ripple orientation are the same (e.g., formed or oriented in the same direction). In this regard, the ripple orientation or ripple lines of all polycarbonate layers, in accordance with certain embodiments of the invention, may be oriented or formed in the same direction such that a ripple orientation of one polycarbonate layer does not cross the ripple orientation or ripple line of any of the other polycarbonate layers.

For instance, polycarbonate sheets or layers, such as those commercially available under the name Lexan®, are manufactured in a monolithic pour environment much like glass. As a result, polycarbonate sheets or layers have a so-called "ripple orientation" which refers to the direction of the flow of the pour. In this regard, the flow of the pour for formation of each of the individual polycarbonate layers, according to certain embodiments of the invention, may be controlled such that each individual polycarbonate layers has been produced with the same directional flow of the pour. Crossing two or multiple ripple lines, for example, can result in an optical distortion. Accordingly, to obtain a desired optical clarity, in accordance with certain embodiments of the invention, the individual polycarbonate layers of the individual polycarbonate layers of the laminate base layer (e.g., the first and second outer base layers, and the interior base layer for embodiments including a three or more layered laminate base layer) sheet may each be manufactured in the same direction. To achieve the optical clarity that is required in the transportation industry, according to such embodiments of the invention, the production process may be controlled so that the "ripple orientation" is the same on all individual polycarbonate layers being laminated together. In addition the sacrificial polycarbonate layer that is attached (e.g., adhered) to the first outer base layer (or the single-layered polycarbonate base layer in such embodiments) may also have the same "ripple" orientation.

The protective shield, according to certain embodiments of the invention, may comprise an adhesive component, in which the adhesive component may directly adhere the sacrificial polycarbonate layer directly to, for example, the first outer base layer for a multi-layered laminate base layer or simply to a first surface of a single-layered base layer. In accordance with certain embodiments of the invention, the adhesive component may be provided over at least a portion of the sacrificial polycarbonate layer and a corresponding portion of the first outer base layer (or first surface of a single-layered base layer). In certain embodiments of the invention, the adhesive component may comprise a substantially continuous layer positioned between and bonding the sacrificial polycarbonate layer and the first outer base layer (or first surface of a single-layered base layer). According to certain other embodiments of the invention, for instance, the adhesive component may be located substantially around an outer perimeter of the sacrificial polycarbonate layer and a corresponding outer perimeter of the first outer base layer (or first surface of a single-layered base layer), wherein a center portion of the sacrificial polycarbonate layer and a corresponding center portion of the first outer base layer (or first surface of a single-layered base layer) are devoid of the adhesive component. Such embodiments having only a perimeter portion of the sacrificial polycarbonate layer and the first outer base layer (or first surface of a single-layered base layer) may provide additional benefits related to, for example, ease of refurbishing the protective shield by removing and replacing the sacrificial polycarbonate layer. The adhesive component, for example, may define an air-tight and/or water-tight seal between the sacrificial polycarbonate layer and the first outer base layer (or the first surface of a single-layered polycarbonate base layer).

In accordance with certain embodiments of the invention, the adhesive component comprises a high green strength, has high elasticity, and may be UV stabilized. Moreover, the adhesive component should also be capable of adhering to polycarbonate sheets/layers, such as those provided under the trade name Lexan®. In accordance with certain embodiments of the invention, for example, the adhesive component may comprise a silyl modified polymer. In accordance with certain embodiments of the invention, the silyl modified polymer may comprise a polyurethane. One exemplary adhesive component comprises a silyl modified polymer from Bostik®, under the trade name Bostik® 70-80A. In accordance with certain embodiments of the invention, the adhesion of the adhesive component may be improved by sanding down the areas of the individual polycarbonate layers to be adhered together by the adhesive component. In such embodiments of the invention, for example, the intended adhesion area of both pieces (e.g., polycarbonate layers) may be sanded to remove any silicone coating on the lean product (e.g., individual polycarbonate layers). In accordance with certain embodiments of the invention, the base layer and the sacrificial polycarbonate layer may each comprise individual polycarbonate layer(s) that are devoid of any surface coating (e.g., a silicone coating) thereon. In accordance with certain embodiments of the invention, other suitable adhesive components by comprise, for example, silicone, silicone elastomer, or silicone-based adhesives (e.g., acetoxy silicone sealants), such as SCS1200 Construction (commercially available for Momentive Performance Materials), Dow Corning® 795 and Dow Corning® 999; and/or urethane or urethane-based adhesives including, for example, BETASEAL™ U-400HV, and BETASEAL™ U-418HV, and BETASEAL™ Express (each from Dow). Additional exemplary adhesive components, according to certain embodiments of the invention, may comprise Surebond's SB-188 (a high temperature silicone sealant), two-part optical adhesives (e.g., HE17017 from Hartel Enterprises), IPS Corporation's two component reactive polyurethane adhesive commercially available under the trade name Weld-On 55. In accordance with certain embodiments of the invention, the adhesive component may comprise an elastic adhesive, such as a polyurethane or polyurethane-containing elastomeric composition that may cure (e.g., either actively or passively) to form an elastomer (e.g., to adhere the base layer and the sacrificial polycarbonate layer together and to provide a seal formed from the elastomer).

The protective shield, according to certain embodiments of the invention, the laminate base layer comprises a total laminate base layer thickness from about 0.25 inches to about 1.0 inches. In accordance with certain embodiments, for instance, the laminate base layer may comprises a total laminate base layer thickness from about 0.25 inches to about 0.75 inches (e.g., about 0.5 inches). The total laminate base layer thickness, for example, may comprise from at least about any of the following: 0.1 inches, 0.2 inches, 0.25 inches, 0.3 inches, and 0.5 inches and/or at most about 1.5 inches, 1.25 inches, 1.0 inches, 0.8 inches, 0.75 inches, 0.7 inches, 0.6 inches, and 0.5 inches. By way of example only, laminate base layers according to certain embodiments may comprise two individual polycarbonate base layers each having a thickness of about 3⁄16 inches to provide a total laminate base layer thickness of about 6⁄16 inches, such as Lexgard® MPC375. In another example embodiment, the laminate base layer may comprise three individual polycarbonate base layers having respective thicknesses of about 1⁄8 inches, 1⁄4 inches (the interior layer), and 1⁄8 inches to provide a total laminate base layer thickness of about 1⁄2 inches, such as Lexgard® MPC500.

The protective shield, according to certain embodiments of the invention, may also comprise a first outer base layer comprising a first outer base layer thickness and the second outer base layer comprising a second outer base layer thickness, in which the first outer base layer thickness may be the same or different as the second outer base layer thickness. In certain embodiments of the invention, the interior base layer comprises an interior base layer thickness, in which the interior base layer thickness may be larger than the both first outer base layer thickness and the second outer base layer thickness. For example, the interior base layer thickness may comprise from about 30 percent to about 70 percent (e.g., about 40 percent to about 60 percent) of the total laminate base layer thickness of the laminate base layer. The interior base layer thickness, for example, may comprise from at least about any of the following: 20%, 30%, 40%, and 50% of the total laminate base layer thickness of the laminate base layer and/or at most about 75%, 70%, 65%, 60%, 55%, and 50 percent of the total laminate base layer thickness of the laminate base layer.

The protective shield, according to certain embodiments of the invention, may comprise a single-layered base layer. The single-layered base layer may comprise a total base layer thickness from about 0.25 inches to about 1.0 inches. In accordance with certain embodiments, for instance, the single-layered base layer may comprises a total base layer thickness from about 0.25 inches to about 0.75 inches (e.g., about 0.5 inches). The total base layer thickness, for example, may comprise from at least about any of the following: 0.1 inches, 0.2 inches, 0.25 inches, 0.3 inches, and 0.5 inches and/or at most about 1.5 inches, 1.25 inches, 1.0 inches, 0.8 inches, 0.75 inches, 0.7 inches, 0.6 inches, and 0.5 inches.

In accordance with certain embodiments of the invention, the protective shield comprises a sacrificial polycarbonate layer, in which the sacrificial polycarbonate layer comprises a sacrificial polycarbonate layer thickness from about 0.15 inches to about 0.5 inches. In certain embodiments, for example, the sacrificial polycarbonate layer thickness comprises from about 0.25 inches to about 0.5 inches. The sacrificial polycarbonate layer thickness, for example, may comprise from at least about any of the following: 0.1 inches, 0.15 inches, 0.2 inches, and 0.25 inches and/or at most about 0.75 inches, 0.5 inches, 0.4 inches, 0.3 inches, and 0.25 inches.

In accordance with certain embodiments of the invention, the protective shield may comprise a thickness ratio between the sacrificial polycarbonate layer thickness to the total laminate base layer thickness comprising from about 1:3 to about 1:5 (e.g., about 1:3.5 to about 1:4). The thickness ratio between the sacrificial polycarbonate layer thickness to the total laminate base layer thickness, for example, may comprise from at least about any of the following: 1:8, 1:7, 1:6, 1:5, and 1:45 and/or at most about 1:1, 1:2, 1:3, 1:3.5, and 1:4.

In accordance with certain embodiments of the invention, the protective shield may comprise a sacrificial polycarbonate layer and a single-layered base layer as noted above. In such embodiments, for example, the protective shield may comprise a thickness ratio between the sacrificial polycarbonate layer thickness to the total base layer thickness (e.g., for a single-layered base layer) comprising from about 1:3 to about 1:5 (e.g., about 1:3.5 to about 1:4). The thickness ratio between the sacrificial polycarbonate layer thickness to the total base layer thickness (e.g., for a single-layered base layer), for example, may comprise from at least about any of the following: 1:8, 1:7, 1:6, 1:5, and 1:45 and/or at most about 1:1, 1:2, 1:3, 1:3.5, and 1:4.

In accordance with certain embodiments, the protective shield may comprise and air gap or air pocket located between (i) the sacrificial polycarbonate layer and (ii) the single-layered polycarbonate base layer or the laminate base layer (e.g., multi-layered base layer). The air gap or air pocket may be defined as a region of air located between the (i) the sacrificial polycarbonate layer and (ii) the single-layered polycarbonate base layer or the laminate base layer (e.g., multi-layered base layer) and surrounded by a perimeter seal formed by, for example, an adhesive component as described herein. For example, the adhesive component may be used to adhesively bond the laminate base layer or the single-layered base layer to the sacrificial polycarbonate layer along corresponding outer portions of the two components, such that the center planar portions of the laminate base layer (or single-layered base layer) and the sacrificial polycarbonate layer are devoid of adhesive. The laminate base layer (or single-layered base layer), the sacrificial polycarbonate layer, and the adhesive component define an air gap or air pocket located there between, with the adhesive component forming the perimeter seal about the entirety of the air gap or air pocket. In this regard, the air gap or air pocket may define an air thickness corresponding to the distance between the sacrificial polycarbonate layer and the polycarbonate base layer (e.g., single or multi-layered) in the z-direction (i.e., the direction in which the individual polycarbonate layers are stacked). As such, the air thickness may comprise from about 1⁄32" to about 1.5" (e.g., 1⁄32" to 1", 1⁄16" to ½", 1⁄16" to 3⁄16", etc.). In accordance with certain embodiments, for example, the air thickness (of the air gap or air pocket) may comprise from at least about any of the following: 1⁄32 inches, 1⁄16 inches, 2⁄16 inches, 3⁄16 inches, and 4⁄16 inches and/or at most about 1.5 inches, 1.25 inches, 1.0 inches, ¾ inches, ½ inches, 5⁄16 inches, 4⁄16 inches, and 3⁄16 inches.

Figure 1:
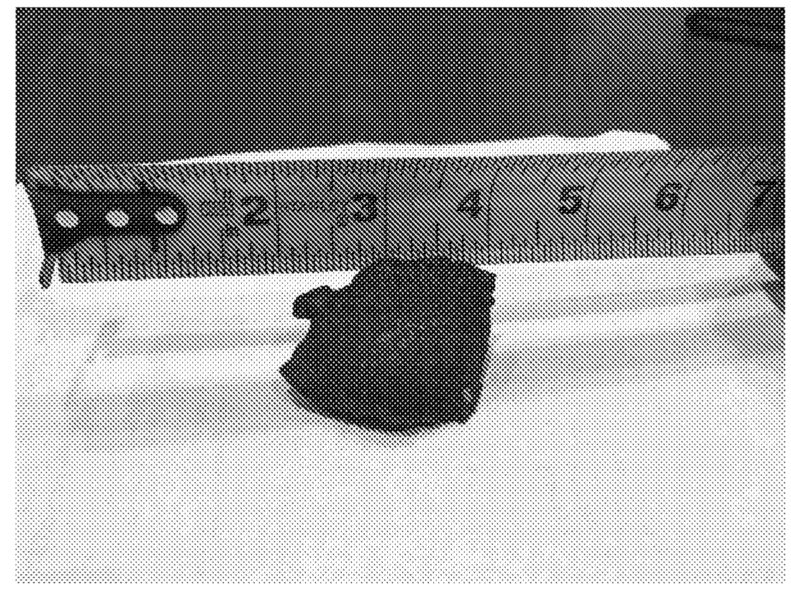
FIG. 1 shows a projectile sheared off from a hammer bit during operation of a hydraulic hammer coupled to an excavator.
Figure 2:
FIG. 2 shows a hole, which was formed by the projectile of FIG. 1, through a 0.25' Lexan® sheet positioned in front of the windshield of an excavator.
Figure 3:
FIG. 3 shows both the hole formed through the 0.25' Lexan® sheet and a hole formed through the windshield of the excavator from the perspective of from within an operator's area/cabin or control compartment.
Figure 4:
FIG. 4 illustrates a hole formed through the glass on the backside of the operator's area/cabin or control compartment.
Figure 5:
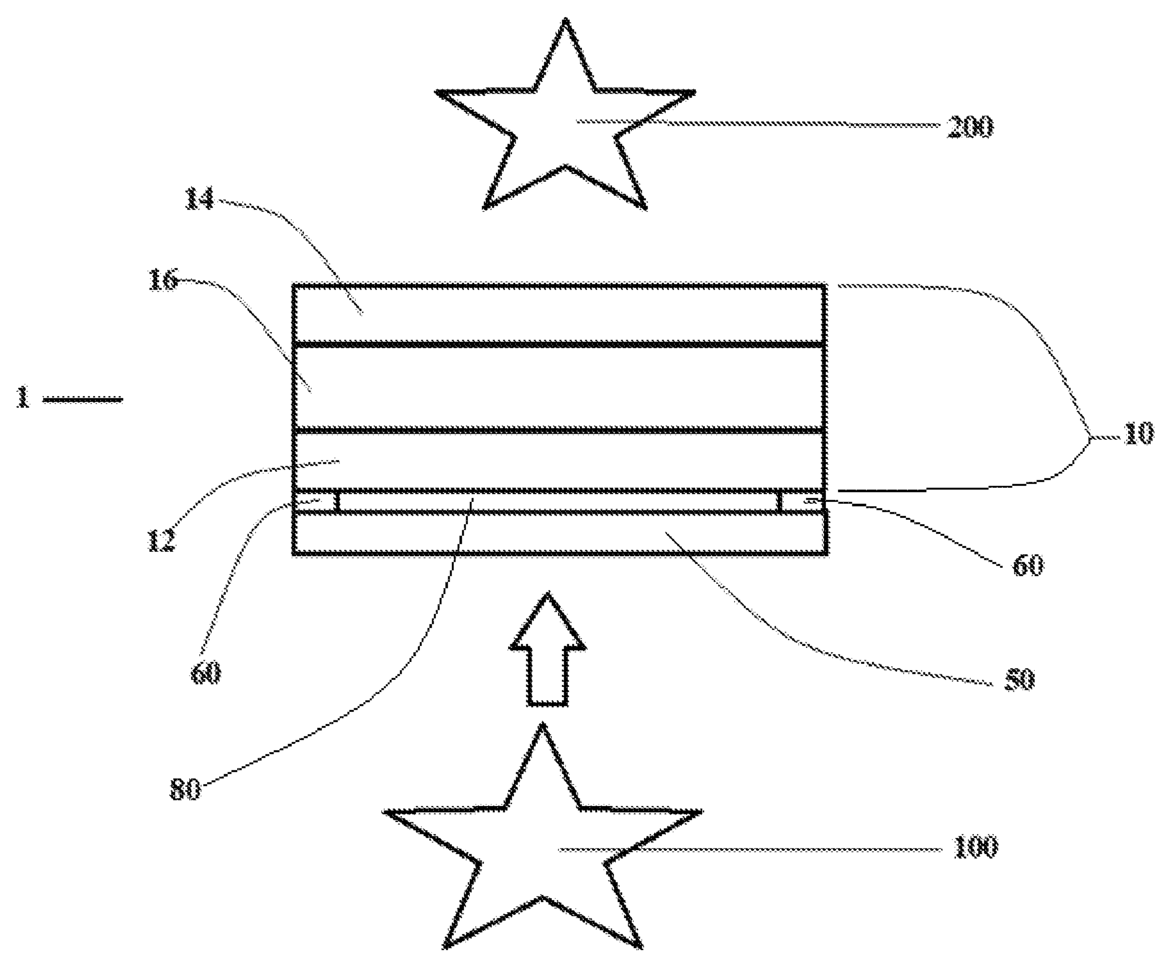
FIG. 5 illustrates an example protective shield according to an embodiment of the invention, in which the protective shield is positioned between a working area and an area to be protected from flying debris.

FIG. 5, for example, illustrates an example protective shield 1 according to an embodiment of the invention, in which the protective shield 1 is positioned between a working area 100 and an area to be protected 200 from flying debris generated at the working area and traveling at least in the direction of the arrow shown in FIG. 5. As shown in FIG. 5, the protective shield 1 includes a laminate base layer 10 and a sacrificial polycarbonate layer 50. The laminate base layer 10 includes a first outer base layer 12, a second outer base layer 14, and an interior base layer 16. As shown in FIG. 5, the sacrificial polycarbonate layer 50 is adhered to the first outer base layer 12 via an adhesive component 60. In the particular embodiment illustrated in FIG. 5, the adhesive component 60 is provided along corresponding outer perimeters of the sacrificial polycarbonate layer 50 and the first outer base layer 12. In such embodiments of the invention, the adhesive component 60 forms a seal between the sacrificial polycarbonate layer 50 and the first outer layer 12. In this regard, the sacrificial polycarbonate layer 50, the first outer layer 12, and the adhesive component define an air gap (or air pocket) 80 between the sacrificial polycarbonate layer 50 and the first outer layer 12. As noted above, however, the adhesive component may be deposited and/or located between the sacrificial polycarbonate layer and the first outer base layer in a variety of configurations.

In accordance with certain embodiments of the invention, the protective shield may also comprise a frame configured for receiving the adhered laminate base layer and sacrificial polycarbonate layer. In this regard, the adhered laminate base layer and sacrificial polycarbonate layer may comprise a single unit which may be deposited or located within the frame. In certain embodiments, for example, the frame may comprise a picture frame structure having a bottom component, a first side component, a second side component and optionally a top component. In this regard, the frame may comprise a generally rectangular structure. In certain embodiments, the top component may be releasably connected to the first side component, the second side component, or both.

According to certain embodiments of the invention, the first side component, the second side component, and the bottom component may comprise a single unitary piece comprising a U-shaped structure. In other embodiments, the first side component, the second side component, and the bottom component may be separate structures which have been attached together via welding, nuts/bolts, etc., in a manner to provide a generally U-shaped structure. In certain embodiments of the invention, at least one or each of the bottom component, the first side component, the second side component and the top component independently comprise a generally U-shaped channel configured for receiving the laminate base layer and the sacrificial polycarbonate layer, which may be adhered or clamped together. In certain embodiments, the bottom component may comprise a generally U-shaped channel and a plurality of weep holes located at a bottom portion of the U-shaped channel of the bottom component. The weep holes for example, may be provided at the lowest portion of the bottom component to facilitate water drainage from the frame and/or protective shield. In this regard, the plurality of weep holes may be configured to allow for water drainage.

The protective shield, according to certain embodiments of the invention, may further comprise one or more setting blocks positioned along the bottom component of the frame. By way of example only, the setting blocks may be positioned every 3 to 5 inches or every 6 to 8 inches along the length of the bottom component (having a generally U-shaped channel) to help maintain integrity of a seal between the frame and attached (e.g., adhered or clamped) polycarbonate layers. Although the composition of the setting blocks may not necessarily be limited, certain exemplary embodiments of the invention comprise setting blocks comprising a santoprene thermoplastic elastomer. In certain embodiments of the invention, for example, the setting blocks comprise Santoprene™ 101-87 (thermoplastic Vulcanizate from ExxonMobil). In accordance with certain embodiments of the invention, the setting blocks may comprise ethylene propylene diene monomer rubber (EPDM).

In accordance with certain embodiments, the protective shield may comprise the frame including one or more hinges directly or indirectly attached to, for example, the first side component of the frame. The one or more hinges may be configured for releasably coupling to a corresponding hinge post or hinge posts of a vehicle, such an excavator. In this regard, the protective shield according to such embodiments may be releasably mounted on a variety of vehicles, such as over a windshield of the vehicle. The mounting of the protective shield may not need to be releasably mounted, such as via one or more hinges, but such hinge-mounted embodiments of the invention provide a configuration providing a simple mounting and removal of the protective shield in the field of operation. Moreover, such a configuration allows the protective shield to be "opened" and "closed" similar to a door to allow of periodic cleaning of both outermost polycarbonate surfaces of the protective shield as well as the vehicle's windshield that is covered and protected by the protective shield during operation of the vehicle.

In another aspect, the invention provides a vehicle comprising an operating area (e.g., a control cabin) configured for an individual to operate the vehicle and a protective shield according to certain protective shield embodiments as disclosed herein. In accordance with certain embodiments of the invention, the protective shield may be releasably mounted on the vehicle. In accordance with certain embodiments, the protective shield may be positioned between the operating area and a working area (e.g., an area in which excavating occurs, which may generate flying debris). In this regard, the protective shield can be mounted to a vehicle (e.g., an excavator, a loader, a skid steer, or the like) prior to operation of the vehicle and can be removed after one or more occurrences of operation. Protective shields, in accordance with certain embodiments of the invention, may also be used in front of stationary hydraulic hammers and in the metal sheering industry to protect individuals and/or other equipment. In accordance with certain embodiments of the invention, the vehicle includes a hydraulic hammer or the like attached thereto.

In yet another aspect, the invention provides a method of forming a protective shield. In accordance with certain embodiments of the invention, the method of forming a protective shield may comprise providing a base layer comprising one or more transparent polycarbonate layers, providing a sacrificial polycarbonate layer comprising a transparent polycarbonate, and directly or indirectly attaching the sacrificial polycarbonate layer to the base layer to define an air gap positioned between at least a portion of the base layer and the sacrificial polycarbonate layer. The base layer, for example, may comprise a single-layered base layer (e.g., one individual layer) or a laminate base layer (e.g., two or more individual polycarbonate layers laminated together). In accordance with certain embodiments of the invention, each polycarbonate layer (e.g., single-layered base layer, individual polycarbonate layers forming a laminate base layer, and the sacrificial polycarbonate layer) includes a respective ripple orientation and each respective ripple orientation may be oriented in the same direction. In accordance with certain embodiments of the invention, the method of forming a protective shield may comprise a step of providing a laminate base layer or a single-layered base layer (e.g., transparent polycarbonate layer), in which the laminate base layer may comprise at least two or three individual transparent polycarbonate layers including a first outer base layer having a first ripple orientation, a second outer base layer having a second ripple orientation, and an interior base layer having a third ripple orientation (for three-layered laminate base layer embodiments). In accordance with certain embodiments of the invention, the first ripple orientation, the second ripple orientation, and the third ripple orientation (for three-layered laminate base layer embodiments) are oriented or formed in the same direction. The method may also include a step of providing a sacrificial polycarbonate layer comprising a transparent polycarbonate and having a fourth ripple orientation. In accordance with certain embodiments of the invention, for example, the method may also comprise aligning the sacrificial polycarbonate layer with the laminate base layer (or single-layered base layer having a ripple orientation) such that the first ripple orientation, the second ripple orientation, the third ripple orientation, and the fourth ripple orientation are oriented in the same direction. In this regard, the ripple orientation or ripple lines of all polycarbonate layers, in accordance with certain embodiments of the invention, may be oriented or formed in the same direction such that a ripple orientation of one polycarbonate layer does not cross the ripple orientation or ripple line of any of the other polycarbonate layers. In accordance with certain embodiments of the invention, the method of forming a protective shield by also comprise directly or indirectly attaching (e.g., via adhesive bonding and/or mechanical clamping) the sacrificial polycarbonate layer to, for example, the first outer layer.

Figure 6:
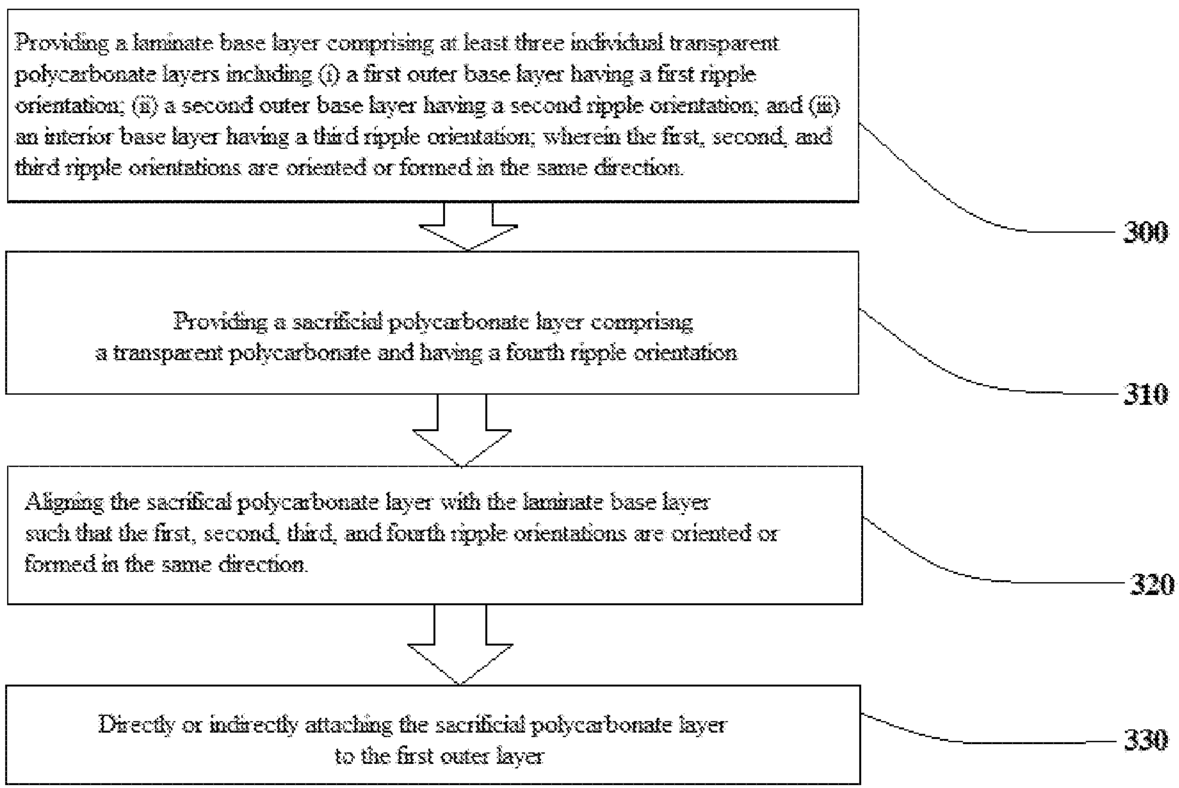
FIG. 6 illustrates a process flow diagram for forming a protective shield according to certain embodiments of the invention.

FIG. 6, for example, illustrates a process flow diagram for forming a protective shield according to certain embodiments of the invention. As illustrated by FIG. 6, methods of forming a protective shield may comprise a step of providing a laminate base layer, in which the laminate base layer may comprise at least three individual transparent polycarbonate layers including (i) a first outer base layer having a first ripple orientation, (ii) a second outer base layer having a second ripple orientation, and (iii) an interior base layer having a third ripple orientation; wherein the first ripple orientation, the second ripple orientation, and the third ripple orientation are oriented in the same direction as indicated by operation 300. Methods according to certain embodiments may also include a step of providing a sacrificial polycarbonate layer comprising a transparent polycarbonate and having a fourth ripple orientation as indicated by operation 310. As shown in FIG. 6, such methods may also include a step of aligning the sacrificial polycarbonate layer with the laminate base layer such that the first ripple orientation, the second ripple orientation, the third ripple orientation, and the fourth ripple orientation are oriented in the same direction as indicated by operation 320. As also shown in FIG. 6, such embodiments of the invention may comprise a step of directly or indirectly attaching the sacrificial polycarbonate layer to the first outer layer as indicated by operation 330. Although FIG. 6 illustrates a method embodiment using a laminate base layer, a single-layered base layer (e.g., transparent polycarbonate layer) may be used in place of the laminate base layer of FIG. 6 in accordance with certain embodiments of the invention.

In accordance with certain embodiments of the invention, the step of directly or indirectly attaching the sacrificial polycarbonate layer to the first outer layer (or a first surface of a single-layered base layer) may comprise adhesively bonding the sacrificial polycarbonate layer to the first outer base layer (or a first surface of a single-layered base layer) with an adhesive component. In certain embodiments, for example, the adhesive component may be deposited substantially around an outer perimeter of the sacrificial polycarbonate layer and a corresponding outer perimeter of the first outer base layer (or a first surface of a single-layered base layer), in which a center portion of the sacrificial polycarbonate layer and a corresponding center portion of the first outer base layer (or a first surface of a single-layered base layer) are devoid of the adhesive component. In this regard, the adhesive component may define an air-tight and/or water-tight seal between the sacrificial polycarbonate layer and the first outer base layer (or a first surface of a single-layered base layer).

In accordance with certain embodiments of the invention, the adhesive component comprises a high green strength, has high elasticity, and may be UV stabilized. Moreover, the adhesive component should also be capable of adhering to polycarbonate sheets/layers, such as those provided under the trade name Lexan®. In accordance with certain embodiments of the invention, for example, the adhesive component may comprise a silyl modified polymer. In accordance with certain embodiments of the invention, the silyl modified polymer may comprise a polyurethane. One exemplary adhesive component comprises a silyl modified polymer from Bostik®, under the trade name Bostik® 70-80A. In accordance with certain embodiments of the invention, the adhesion of the adhesive component may be improved by sanding down the areas of the individual polycarbonate layers to be adhered together by the adhesive component. In such embodiments of the invention, for example, the intended adhesion area of both pieces (e.g., polycarbonate layers) may be sanded to remove any silicone coating on the lean product (e.g., individual polycarbonate layers). In accordance with certain embodiments of the invention, the base layer and the sacrificial polycarbonate layer may each comprise individual polycarbonate layer(s) that are devoid of any surface coating (e.g., a silicone coating) thereon. In accordance with certain embodiments of the invention, other suitable adhesive components by comprise, for example, silicone, silicone elastomer, or silicone-based adhesives (e.g., acetoxy silicone sealants), such as SCS1200 Construction (commercially available for Momentive Performance Materials), Dow Corning® 795 and Dow Corning® 999; and/or urethane or urethane-based adhesives including, for example, BETASEAL™ U-400HV, and BETASEAL™ U-418HV, and BETASEAL™ Express (each from Dow). Additional exemplary adhesive components, according to certain embodiments of the invention, may comprise Surebond's SB-188 (a high temperature silicone sealant), two-part optical adhesives (e.g., HE17017 from Hartel Enterprises), IPS Corporation's two component reactive polyurethane adhesive commercially available under the trade name Weld-On 55. In accordance with certain embodiments of the invention, the adhesive component may comprise an elastic adhesive, such as a polyurethane or polyurethane-containing elastomeric composition that may cure (e.g., either actively or passively) to form an elastomer (e.g., to adhere the base layer and the sacrificial polycarbonate layer together and to provide a seal formed from the elastomer).

According to certain embodiments of the invention, the laminate base layer comprises a total laminate base layer thickness from about 0.25 inches to about 1.0 inches. In accordance with certain embodiments, for instance, the laminate base layer may comprises a total laminate base layer thickness from about 0.25 inches to about 0.75 inches (e.g., about 0.5 inches). The total laminate base layer thickness, for example, may comprise from at least about any of the following: 0.1 inches, 0.2 inches, 0.25 inches, 0.3 inches, and 0.5 inches and/or at most about 1.5 inches, 1.25 inches, 1.0 inches, 0.8 inches, 0.75 inches, 0.7 inches, 0.6 inches, and 0.5 inches. By way of example only, laminate base layers according to certain embodiments may comprise two individual polycarbonate base layers each having a thickness of about 3/16 inches to provide a total laminate base layer thickness of about 6/16 inches, such as Lexgard® MPC375. In another example embodiment, the laminate base layer may comprise three individual polycarbonate base layers having respective thicknesses of about 1/8 inches, 1/4 inches (the interior layer), and 1/8 inches to provide a total laminate base layer thickness of about 1/2 inches, such as Lexgard® MPC500.

According to certain embodiments of the invention, the first outer base layer comprises a first outer base layer thickness and the second outer base layer comprising a second outer base layer thickness, in which the first outer base layer thickness may be the same or different as the second outer base layer thickness. In certain embodiments of the invention, the interior base layer comprises an interior base layer thickness, in which the interior base layer thickness may be larger than the both first outer base layer thickness and the second outer base layer thickness. For example, the interior base layer thickness may comprise from about 30 percent to about 70 percent (e.g., about 40 percent to about 60 percent) of the total laminate base layer thickness of the laminate base layer. The interior base layer thickness, for example, may comprise from at least about any of the following: 20%, 30%, 40%, and 50% of the total laminate base layer thickness of the laminate base layer and/or at most about 75%, 70%, 65%, 60%, 55%, and 50 percent of the total laminate base layer thickness of the laminate base layer.

The protective shield, according to certain embodiments of the invention, may comprise a single-layered base layer. The single-layered base layer may comprise a total base layer thickness from about 0.25 inches to about 1.0 inches. In accordance with certain embodiments, for instance, the single-layered base layer may comprises a total base layer thickness from about 0.25 inches to about 0.75 inches (e.g., about 0.5 inches). The total base layer thickness, for example, may comprise from at least about any of the following: 0.1 inches, 0.2 inches, 0.25 inches, 0.3 inches, and 0.5 inches and/or at most about 1.5 inches, 1.25 inches, 1.0 inches, 0.8 inches, 0.75 inches, 0.7 inches; 0.6 inches, and 0.5 inches.

In accordance with certain embodiments of the invention, the sacrificial polycarbonate layer comprises a sacrificial polycarbonate layer thickness from about 0.15 inches to about 0.5 inches. In certain embodiments, for example, the sacrificial polycarbonate layer thickness comprises from about 0.25 inches to about 0.5 inches. The sacrificial polycarbonate layer thickness, for example, may comprise from at least about any of the following: 0.1 inches, 0.15 inches, 0.2 inches, and 0.25 inches and/or at most about 0.75 inches, 0.5 inches, 0.4 inches, 0.3 inches, and 0.25 inches.

In accordance with certain embodiments of the invention, the protective shield may comprise a thickness ratio between the sacrificial polycarbonate layer thickness to the total laminate base layer thickness comprising from about 1:3 to about 1:5 (e.g., about 1:3.5 to about 1:4). The thickness ratio between the sacrificial polycarbonate layer thickness to the total laminate base layer thickness, for example, may comprise from at least about any of the following: 1:8, 1:7, 1:6, 1:5, and 1:45 and/or at most about 1:1, 1:2, 1:3, 1:3.5, and 1:4.

In accordance with certain embodiments of the invention, the protective shield may comprise a sacrificial polycarbonate layer and a single-layered base layer as noted above. In such embodiments, for example, the protective shield may comprise a thickness ratio between the sacrificial polycarbonate layer thickness to the total base layer thickness (e.g., for a single-layered base layer) comprising from about 1:3 to about 1:5 (e.g., about 1:3.5 to about 1:4). The thickness ratio between the sacrificial polycarbonate layer thickness to the total base layer thickness (e.g., for a single-layered base layer), for example, may comprise from at least about any of the following: 1:8, 1:7, 1:6, 1:5, and 1:45 and/or at most about 1:1, 1:2, 1:3, 1:3.5, and 1:4.

In accordance with certain embodiments, the protective shield may comprise and air gap or air pocket located between (i) the sacrificial polycarbonate layer and (ii) the single-layered polycarbonate base layer or the laminate base layer (e.g., multi-layered base layer). The air gap or air pocket may be defined as a region of air located between the (i) the sacrificial polycarbonate layer and (ii) the single-layered polycarbonate base layer or the laminate base layer (e.g., multi-layered base layer) and surrounded by a perimeter seal formed by, for example, an adhesive component as described herein. For example, the adhesive component may be used to adhesively bond the laminate base layer or the single-layered base layer to the sacrificial polycarbonate layer along corresponding outer portions of the two components, such that the center planar portions of the laminate base layer (or single-layered base layer) and the sacrificial polycarbonate layer are devoid of adhesive. The laminate base layer (or single-layered base layer), the sacrificial polycarbonate layer, and the adhesive component define an air gap or air pocket located there between, with the adhesive component forming the perimeter seal about the entirety of the air gap or air pocket. In this regard, the air gap or air pocket may define an air thickness corresponding to the distance between the sacrificial polycarbonate layer and the polycarbonate base layer (e.g., single or multi-layered) in the z-direction (i.e., the direction in which the individual polycarbonate layers are stacked). As such, the air thickness may comprise from about 1/32" to about 1.5" (e.g., 1/32" to 1", 1/16" to 1/2", 1/16" to 3/16", etc.). In accordance with certain embodiments, for example, the air thickness (of the air gap or air pocket) may comprise from at least about any of the following: 1/32 inches, 1/16 inches, 2/16 inches, 3/16 inches, and 4/16 inches and/or at most about 1.5 inches, 1.25 inches, 1.0 inches, 3/4 inches, 1/2 inches, 5/16 inches, 4/16 inches, and 3/16 inches.

In accordance with certain embodiments of the invention, methods for forming a protective shield may further comprise a step of positioning the laminate base layer and the sacrificial polycarbonate layer (the two components, for example, being adhered or clamped together) within a frame. In accordance with certain embodiments of the invention, the frame may be configured for receiving the adhered laminate base layer and sacrificial polycarbonate layer. In this regard, the adhered laminate base layer and sacrificial polycarbonate layer may comprise a single unit which may be deposited or located within the frame. In certain embodiments, for example, the frame may comprise a picture frame structure having a bottom component, a first side component, a second side component and optionally a top component. In this regard, the frame may comprise a generally rectangular structure. In certain embodiments, the top component may be releasably connected to the first side component, the second side component, or both.

According to certain embodiments of the invention, the first side component, the second side component, and the bottom component may comprise a single unitary piece comprising a U-shaped structure. In other embodiments, the first side component, the second side component, and the bottom component may be separate structures which have been attached together via welding, nuts/bolts, etc., in a manner to provide a generally U-shaped structure. In certain embodiments of the invention, at least one or each of the bottom component, the first side component, the second side component and the top component independently comprise a generally U-shaped channel configured for receiving the laminate base layer and the sacrificial polycarbonate layer, which may be adhered or clamped together. In certain embodiments, the bottom component may comprise a generally U-shaped channel and a plurality of weep holes located at a bottom portion of the U-shaped channel of the bottom component. The weep holes for example, may be provided at the lowest portion of the bottom component to facilitate water drainage from the frame and/or protective shield. In this regard, the plurality of weep holes may be configured to allow for water drainage.

Methods of forming a protective shield, according to certain embodiments of the invention, may further comprise a step of positioning one or more setting blocks along the bottom component of the frame; wherein the one or more setting blocks contact a forward facing side of the sacrificial polycarbonate layer. By way of example only, the setting blocks may be positioned every 3 to 5 inches or every 6 to 8 inches along the length of the bottom component (having a generally U-shaped channel) to help maintain integrity of a seal between the frame and attached (e.g., adhered or clamped) polycarbonate layers. Although the composition of the setting blocks may not necessarily be limited, certain exemplary embodiments of the invention comprise setting blocks comprising a santoprene thermoplastic elastomer. In certain embodiments of the invention, for example, the setting blocks comprise Santoprene' 101-87 (thermoplastic Vulcanizate from ExxonMobil). In accordance with certain embodiments of the invention, the setting blocks may comprise ethylene propylene diene monomer rubber (EPDM).

WORKING EXAMPLES

The present disclosure is further illustrated by the following working example, which in no way should be construed as being limiting. That is, the specific features described in the following example are merely illustrative and not limiting.

I.

A protective shield was constructed by adhesively bonding a laminate base layer to a sacrificial polycarbonate layer. For the laminate base layer, a LEXGARD® MPC500 laminate (a laminated Lexan® product providing UL752 bullet resistance using ⅛", ¼", and ⅛" Lexan® sheets laminated together). For the sacrificial polycarbonate layer, a ¼" sheet of Lexan® MR10 (Mar Resistant) polycarbonate sheet was utilized. The sacrificial polycarbonate layer was adhered to the front of the laminate base layer to form a single unit that was 34"W×60" H×⅞" thick and weighing approximately 70 pounds.

The adhesive component used for attaching the laminate base layer to the sacrificial polycarbonate layer was Bostik® 70-08A. To improve adhesion, the surface coating on the sacrificial polycarbonate layer and the laminate base layer was sanded off (at the locations for which adhesive is to be applied). The adhesive or frit area was approximated 1 inch around the outer edge of the sacrificial polycarbonate layer and corresponding first outer base layer. The frit area consisted of a ¼ inch×3/16 inch foam dam set at ¾ inch in from the outer edge. Then a ⅝"×½" bead of Bostik® 70-08A adhesive was laid from the outer edge of the laminate base layer (e.g., LEXGARD® MPC500 laminate) to the edge of the foam dam. Then the sacrificial polycarbonate layer (e.g., MR10) was laid over the laminate base layer (e.g., LEXGARD® MPC500 laminate) and clamped down to form an assembly that was ⅞ inches thick. As the sacrificial polycarbonate layer (e.g., MR10) was clamped down the urethane (adhesive component) flowed out the edge of the assembly creating a water tight, air tight seal that keeps out dirt and humidity that would cause optical problems. The overflow was then smoothed onto the edge and additional Bostik® 70-08A was added to create a ⅛" seal all the way around the outer edge.

Figure 7:
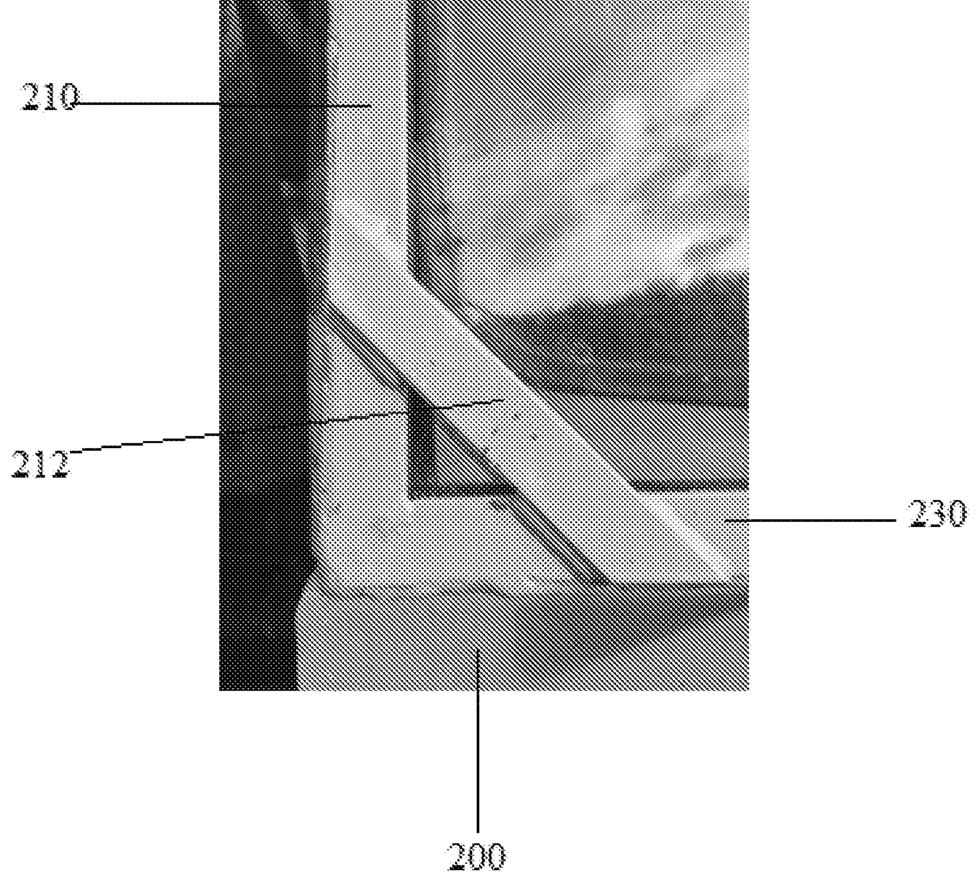
FIG. 7 shows a partial view of a protective shield including a frame, in which the frame includes angled supports according to one embodiment of the invention.

Due to the weight of the protective shield, approximately 70 pounds, and the constant vibration of the hydraulic hammer while running, a frame and mounting system was developed that would allow for easy machine maintenance and product field service. The fame of this working example, for example, was formed from 1¼" steel angle iron making a picture frame structure that was approximately 34½" w by 61" tall by 1¼" deep. The frame included a first side component, a second side component, and a bottom component forming a U-shaped structure allowing the protective shield to slide into the frame from the top. In this embodiment, the U-shaped structure was supported by angled supports on the bottom two corners, front and back, and across the top of the frame using 1'×¼" flat steel stock as illustrated in FIG. 7. The angled supports provide additional rigidity to the frame and in addition the bar along the top serves to complete the fame and offer additional support. FIG. 7 illustrates a partial view of a frame 200 including the first side component 210, bottom component 230, and angled support 212. On the bottom channel of the frame, weep holes were drilled to allow for water drainage. Further, santoprene setting blocks were set every six to eight inches in the bottom channel to maintain the integrity of the seal on the bottom of the protective shield.

On the left side of the frame (e.g., on the side of the first side component 210), as shown in FIGS. 8 and 9, two barrel hinges 250 were attached to the first side component 210 of the frame that allow for easy mounting to hinge posts that may be welded onto the frame of the machine (e.g. an excavator). In this particular embodiment, an additional support was desired to help support the weight of the frame 200. As shown in FIG. 10, this was accomplished by the welding of two additional supports 235 to the base of the machine (e.g., an excavator) of angle iron welded on a base plate which is welded to the front of the excavator.

On the right side of the frame (e.g., on the side of the first side component 220), which in this embodiment comprises the opening side of the frame, is held in place by two rubber handles that lock the frame down and allow for easy opening of the frame to allow for easy access to the back side of the protective shield and the windshield of the machine for cleaning. FIG. 11, for instance shows the frame 200 mounted onto a machine, in which the frame is in an open position for cleaning and includes a first side component 210, second side component 220, bottom component 230, and a top component 240. FIG. 12, for instance, shows the frame 200 mounted onto a machine, in which the frame is in a closed position and overlying the windshield of the machine. As shown in FIG. 12, the frame 200 is secured to the machine on the left side (e.g., side of the second side component) by locking rubber handles 225.

FIG. 13 illustrates a protective shield 1 mounted onto a machine and positioned between a working area and a windshield of the machine. As shown in FIG. 13, the protective shield is in a closed position. In this regard, the protective shield according to certain embodiments of the invention provide for fast and efficient field service. For instance, due to the caustic nature of the mining environment, rock debris is ejected as part of the process. The sacrificial polycarbonate layer, which is closest to the working area from which debris is generated, acts as a sacrificial sheet to protect the more expensive laminate base layer. This outermost sacrificial polycarbonate layer may need to be replaced every two to three months. As such, embodiments of the invention disclosed herein can limit and/or mitigate machine down time. For instance, the frame of the protective shield can be unlatched and lifted off the barrel hinges by, for example, two men. The unit may then be set on the ground and the attached laminate base layer/sacrificial polycarbonate layer can be pulled out from the frame. A temporary shield may then be installed and the frame remounted on the barrel hinges and the machine is put back into production. The original shield may then be rebuilt by removing and replacing the sacrificial polycarbonate layer. Then the original unit (e.g., the original protective shield) may be returned to the mine and reinstalled in the frame. Total replacement time on the machine (e.g., an excavator) for shield replacement can be less than an hour.

II.

An 8"×10" (length by width, in which the individual polycarbonate layers are stacked in the z-direction) protective shield in accordance with certain embodiments of the invention were formed from a laminate base layer (e.g., LEXGARD® MPC500 laminate) and a sacrificial polycarbonate layer (e.g., MR10). Bostik® 70-08A was used to adhesively bond the laminate base layer to the sacrificial polycarbonate layer along corresponding outer portions of the two components, such that the center planar portions of the laminate base layer and the sacrificial polycarbonate layer were devoid of adhesive. The laminate base layer, the sacrificial polycarbonate layer, and the adhesive component defined an air gap or air pocket located between the laminate base layer and the sacrificial polycarbonate layer, with the adhesive component forming the perimeter seal about the entirety of the air gap or air pocket. In this particular embodiment, the air gap or air pocket was 3⁄16". That is the corresponding portions of the laminate base layer and the sacrificial polycarbonate layer being devoid of adhesive was spaced apart by 3⁄16". The protective shield was subjected to bullet testing with .357 JHP ammunition, in which the sacrificial polycarbonate layer of the protective shield was directly shot. FIG. 14 shows the front portion (i.e., the sacrificial polycarbonate layer 50 is closest in the view of FIG. 14) of the protective shield 1 after bullet testing. As shown in FIG. 14, the .357 JHP ammunition penetrated the sacrificial polycarbonate layer 50 and formed three holes 57 through the sacrificial polycarbonate layer 50.

FIG. 15 shows the backside (i.e., closest layer in view is the second outer base layer 14) of the protective shield 1 of FIG. 14 and illustrates that the protective shield remains structurally sound after the bullet testing. As shown in FIG. 15, for instance, the laminate base layer was not completely penetrated by the bullet testing. In this regard, certain embodiments of the invention may comprise properties sufficient for obtaining a UL752 ballistic rating.

III.

An additional An 8"×10" (length by width, in which the individual polycarbonate layers are stacked in the z-direction) protective shield in accordance with certain embodiments of the invention were formed as described in the previous example II, but instead of using a three-layered laminate base layer a single-layered base layer was utilized. The single-layered base layer was a ½" polycarbonate sheet (e.g., Lexan®). A 3⁄16" air gap or air pocket was formed in the same manner as described in example II. The protective shield was subjected to bullet testing with .357 JHP ammunition, in which the sacrificial polycarbonate layer of the protective shield was directly shot. FIG. 16 shows the front portion (i.e., the sacrificial polycarbonate layer 50 is closest in the view of FIG. 16) of the protective shield 1 after bullet testing. As shown in FIG. 16, the .357 JHP ammunition penetrated the sacrificial polycarbonate layer 50 and formed three holes 57 through the sacrificial polycarbonate layer 50.

FIG. 17 shows the backside (i.e., closest layer in view is the base layer 10) of the protective shield 1 of FIG. 16 and illustrates that the protective shield remains structurally sound after the bullet testing. As shown in FIG. 17, for instance, the base layer was not completely penetrated by the bullet testing. In this regard, certain embodiments of the invention may comprise properties sufficient for obtaining a UL752 ballistic rating.

IV.

An additional protective shield in accordance with certain embodiments of the invention was formed in the manner described in examples II and III. For this particular protective shield, a ½" sacrificial polycarbonate layer (e.g., Lexan®), a ½" single-layered polycarbonate base layer (e.g., Lexan®). and a ¼" air gap was utilized. The protective shield subjected to four separate shots at varying projectile velocities. Each shot impacted the protective shield at a different location on the protective shield. The first shot used a projectile velocity of 276 miles-per-hour (mph), the second shot used a projectile velocity of 175 mph, the third shot used a projectile velocity of 258 mph, and the fourth shot used a projectile velocity of 252 mph. As shown in FIG. 18, the protective shield passed all four test shots as the projectile did not penetrate through the entirety of the protective shield. That is, the projectile from all shots failed to penetrate through the sacrificial polycarbonate layer and the single-layered polycarbonate base layer. In particular, the first and fourth shots penetrated the sacrificial polycarbonate layer, but not the single-layered polycarbonate base layer while the second and third shots did not even penetrate the sacrificial polycarbonate layer.

V.

An additional protective shield in accordance with certain embodiments of the invention was formed in the manner described in example IV. For this particular protective shield, laminate base layer comprising three individual polycarbonate base layers (i.e., Lexgard® MPC500—Level 2 UL Rated), and a ¼" air gap was utilized. The laminate base layer consisted of two outer polycarbonate layers each having a thickness of ⅛", an interior polycarbonate layer having a thickness of a ¼", and a 0.015 inch urethane interlayer between the interior polycarbonate layer and each outer polycarbonate layer. The protective shield subjected to five separate shots at varying projectile velocities. Each shot impacted the protective shield at a different location on the protective shield. The first shot used a projectile velocity of 256 miles-per-hour (mph), the second shot used a projectile velocity of 175 mph, the third shot used a projectile velocity of 222 mph, the fourth shot used a projectile velocity of 243 mph, and the fifth shot used a projectile velocity of 299 mph. As shown in FIG. 19, the protective shield passed all five test shots as the projectile did not penetrate through the entirety of the protective shield. That is, the projectile from all shots failed to penetrate through the sacrificial polycarbonate layer and the laminate base layer. In particular, the first and second shots failed to penetrate the sacrificial polycarbonate layer, the third shot only penetrated the sacrificial polycarbonate layer, while the fourth and fifth exhibited visual representation of fissures but failed to penetrate or pass through the entirety of the protective shield.

The protective shields illustrated in Examples IV and V may be mounted to a vehicle or other piece of equipment by a variety of mechanical means, such as those previously disclosed and as illustrated in FIGS. 20 and 21. For example, FIGS. 20 and 21 illustrate an integrated mounting system comprising the protective shield 1 housed within a shield-frame 300, a sub-frame 350, and mounting brackets 375. The mounting brackets may be customized for the make and model of a given vehicle and may mount directly, for example, to the cab bosses of vehicles. As shown in FIGS. 20 and 21, the sub-frame 350 may de directly mounted (attached) to the mounting brackets 375. The shield-frame 300 may the rest (e.g., mounted) on a hinge-system comprising one or more hinges 310 that allows for easy access to the backside of the protective shield and the cab windshield for cleaning and/or maintenance. In the regard, the shield-frame 300 can be easily removed from the sub-frame 350 so that the protective shield 1 replacement can be managed in a matter of minutes if so needed. For example, FIG. 20 illustrates a protective shield 1 in accordance with certain embodiments of the invention housed in a shield-frame 300 and mounted to a vehicle via a sub-frame 350 and mounting brackets 375, in which the protective shield/shield frame are in an "opened" position relative to the sub-frame. FIG. 21 illustrates the protective shield/shield-frame in a "closed" or "operating" position relative to the sub-frame. In this regard, the shield-frame 300 may be maintained in a "closed" or "operating" position relative to the sub-frame 350 by a releasably locking latch 312.

As shown in FIG. 22, the shield-frame 300 may include a top shield-frame member 340 that may be removable or releasable attached to the side shield-frame members 342, 343 to allow insertion of the protective shield 1 into the shield-frame 300 and removal of the protective shield 1 from the shield-frame 300. The top shield-frame member 340 may be held in place, for example, by locking handles 325.

COMPARATIVE EXAMPLE

A comparative example was formed and tested in the same manner as Examples IV and V. In the comparative example, however, a protective shield was formed from only a standard ½" sheet of polycarbonate and subjected to projective testing. The protective shield of the comparative example was impacted with three different shots each having a different projectile velocity. The first shot used a projectile velocity of 235 miles-per-hour (mph), the second shot used a projectile velocity of 224 mph, and the third shot used a projectile velocity of 243 mph. The protective shield subjected to four separate shots at varying projectile velocities. Each shot impacted the protective shield at a different location on the protective shield. The first two shots showed impact points but no noticeable cracking. However, at the molecular level there were fissures developing throughout the protective shield (e.g., the standard ½" sheet of polycarbonate). As shown in FIG. 22, the protective shield in the comparative example failed after the third shot (i.e., projective velocity of 243 mph) by shattering and documenting the circular pattern prominent in fissure development throughout the testing.

Non-Limiting Example Embodiments

The following non-limiting example embodiments are provided to further illustrated different elements and combination of elements as disclosed herein. These non-limiting example embodiments should in no way should be construed as being limiting. That is, the specific features described in the following non-limiting example embodiments are merely illustrative and not limiting.

Paragraph [A]: A protective shield, comprising: (a) a base layer comprising one or more transparent polycarbonate layers (e.g., 1 to 5 individual polycarbonate layers); (b) a sacrificial polycarbonate layer comprising a transparent polycarbonate, wherein the sacrificial polycarbonate layer is directly or indirectly attached to the base layer; and (c) an air gap positioned directly between at least a portion of the base layer and the sacrificial polycarbonate layer. The base layer may comprise (a-1) a single-layered base layer having a single-layered base layer ripple orientation or (a-2) a laminate base layer, the laminate base layer comprising at least three individual transparent polycarbonate layers including (i) a first outer base layer having a first ripple orientation, (ii) a second outer base layer having a second ripple orientation, and (iii) an interior base layer having a third ripple orientation. The air gap may be positioned directly between at least a portion of the base layer (e.g., a-1 or a-2 as described above) and the sacrificial polycarbonate layer; the sacrificial polycarbonate layer being directly or indirectly attached to a first outer surface of the single-layered base layer or the first outer base layer; wherein the first ripple orientation, the second ripple orientation, the third ripple orientation, and the fourth ripple orientation are oriented in the same direction (in embodiments with a laminate base layer) or the a single-layered base layer ripple orientation and the fourth ripple orientation are oriented in the same direction (in embodiments with a single-layered base layer).

Paragraph [B]: The protective shield of Paragraph [A], further comprising an adhesive component, wherein the adhesive component directly adheres the sacrificial polycarbonate layer directly to the first outer surface of the single-layered base layer in such embodiments or the first outer base layer in such embodiments utilizing a laminate base layer.

Paragraph [C]: The protective shield of Paragraph [B], wherein the adhesive component is located substantially around an outer perimeter of the sacrificial polycarbonate layer and a corresponding outer perimeter of the first outer surface of the single-layered base layer in such embodiments or the first outer base layer in such embodiments utilizing a laminate base layer, wherein a center portion of the sacrificial polycarbonate layer and a corresponding center portion of the first outer surface of the single-layered base layer in such embodiments or the first outer base layer in such embodiments utilizing a laminate base layer are devoid of the adhesive component.

Paragraph [D]: The protective shield of Paragraphs [B] to [C], wherein the adhesive component defines an air-tight and water-tight seal between the sacrificial polycarbonate layer and the first outer surface of the single-layered base layer in such embodiments or the first outer base layer in such embodiments utilizing a laminate base layer.

Paragraph [E]: The protective shield of Paragraphs [B] to [C], wherein the adhesive component comprises a silyl modified polymer.

Paragraph [F]: The protective shield of Paragraphs [E], wherein the silyl modified polymer comprise a polyurethane.

Paragraph [G]: The protective shield according to Paragraphs [A] to [F], wherein the base layer comprises a total laminate base layer thickness from about 0.25 inches to about 1.0 inches.

Paragraph [H]: The protective shield according to Paragraphs [A] to [G], wherein the base layer comprises a total laminate base layer thickness from about 0.25 inches to about 0.75 inches.

Paragraph [I]: The protective shield according to Paragraphs [A] to [H], wherein the base layer comprises a laminate base layer and the first outer base layer comprises a first outer base layer thickness and the second outer base layer comprises a second outer base layer thickness, the first outer base layer thickness being the same as the second outer base layer thickness.

Paragraph [J]: The protective shield according to Paragraphs [A] to [H], wherein the first outer base layer thickness is different than the second outer base layer thickness.

Paragraph [K]: The protective shield according to Paragraphs [A] to [J], wherein the interior base layer comprises an interior base layer thickness, the interior base layer thickness being larger than the first outer base layer thickness and the second outer base layer thickness.

Paragraph [L]: The protective shield according to Paragraphs [A] to [K], wherein the interior base layer thickness comprise from about 30 percent to about 70 percent of the total laminate base layer thickness of the laminate base layer.

Paragraph [M]: The protective shield according to Paragraphs [A] to [L], wherein the interior base layer thickness comprise from about 40 percent to about 60 percent of the total laminate base layer thickness of the laminate base layer.

Paragraph [N]: The protective shield according to Paragraphs [A] to [M], wherein the sacrificial polycarbonate layer comprises a sacrificial polycarbonate layer thickness from about 0.15 inches to about 0.5 inches.

Paragraph [O]: The protective shield according to Paragraphs [A] to [N], wherein the sacrificial polycarbonate layer comprises a sacrificial polycarbonate layer thickness from about 0.25 inches to about 0.5 inches.

Paragraph [P]: The protective shield according to Paragraphs [A] to [O], wherein a thickness ratio between the sacrificial polycarbonate layer thickness to the total laminate base layer thickness comprises from about 1:3 to about 1:5.

Paragraph [Q]: The protective shield according to Paragraphs [A] to [P], wherein a thickness ratio between the sacrificial polycarbonate layer thickness to the total laminate base layer thickness comprises from about 1:3.5 to about 1:4.

Paragraph [R]: The protective shield according to Paragraphs [A] to [Q], further comprising a frame configured for receiving the protective shield, said protective shield being located within the frame.

Paragraph [S]: The protective shield according to Paragraph [R], wherein the frame comprises a picture frame structure having a bottom component, a first side component, a second side component and optionally a top component.

Paragraph [T]: The protective shield according to Paragraph [S], wherein the top component is releasably connected to the first side component, the second side component, or both.

Paragraph [U]: The protective shield according to Paragraphs [R] to [S], wherein first side component, the second side component, and the bottom component comprise a single unitary piece comprising a U-shaped structure.

Paragraph [V]: The protective shield according to Paragraphs [R] to [U], wherein each of the bottom component, the first side component, the second side component and the top component each independently comprise a generally U-shaped channel configured for receiving the base layer and the sacrificial polycarbonate layer.

Paragraph [W]: The protective shield according to Paragraphs [R] to [V], wherein bottom component comprises a generally U-shaped channel and a plurality of weep holes located at a bottom portion of the U-shaped channel of the bottom component.

Paragraph [X]: The protective shield according to Paragraph [W], wherein the plurality of weep holes are configured to allow for water drainage.

Paragraph [Y]: The protective shield according to Paragraphs [S] to [X], further comprising setting blocks wherein positioned along the bottom component of the frame.

Paragraph [Z]: The protective shield according to Paragraph [Y], wherein the setting blocks comprise a santoprene thermoplastic elastomer.

Paragraph [AA]: The protective shield according to Paragraphs [R] to [X], further comprising one or more hinges directly or indirectly attached to the first side component of the frame.

Paragraph [AB]: The protective shield according to Paragraphs [R] to [X], wherein the one or more hinges are configured for releasably coupling to a corresponding hinge post or hinge posts of a vehicle.

Paragraph [AC]: The protective shield according to Paragraph [AB], wherein the vehicle comprise an excavator.

Paragraph [AD]: A vehicle, comprising: (a) an operating area configured for an individual to operate the vehicle; and (b) a protective shield according to any one of Paragraphs [A] to [AC], wherein the protective shield is releasably mounted on the vehicle.

Paragraph [AE]: The vehicle according to Paragraph [AD], wherein the protective shield is positioned between the operating area and a working area.

Paragraph [AF]: The vehicle according to Paragraph [AE], wherein the vehicle comprise an excavator.

Paragraph [AG]: The vehicle according to any one of Paragraphs [AD] to [AF], wherein the vehicle includes a hydraulic hammer attached thereto.

Paragraph [AH]: A method of forming a protective shield, comprising: (a) providing a base layer comprising one or more transparent polycarbonate layers; (b) providing a sacrificial polycarbonate layer comprising a transparent polycarbonate; (c) directly or indirectly attaching the sacrificial polycarbonate layer to the base layer to define an air gap positioned between at least a portion of the base layer and the sacrificial polycarbonate layer. The base layer may comprise (a-1) a single-layered base layer having a single-layered base layer ripple orientation or (a-2) a laminate base layer, the laminate base layer comprising at least three individual transparent polycarbonate layers including (i) a first outer base layer having a first ripple orientation, (ii) a second outer base layer having a second ripple orientation, and (iii) an interior base layer having a third ripple orientation. The air gap may be positioned directly between at least a portion of the base layer (e.g., a-1 or a-2 as described above) and the sacrificial polycarbonate layer; the sacrificial polycarbonate layer being directly or indirectly attached to a first outer surface of the single-layered base layer or the first outer base layer; wherein the first ripple orientation, the second ripple orientation, the third ripple orientation, and the fourth ripple orientation are oriented in the same direction (in embodiments with a laminate base layer) or the a single-layered base layer ripple orientation and the fourth ripple orientation are oriented in the same direction (in embodiments with a single-layered base layer).

Paragraph [AI]: The method according to Paragraph [AH], wherein the step of directly or indirectly attaching the sacrificial polycarbonate layer to the first outer surface of the single-layered base layer in such embodiments or the first outer base layer in such embodiments utilizing a laminate base layer comprises bonding the sacrificial polycarbonate layer to the first outer surface of the single-layered base layer in such embodiments or the first outer base layer in such embodiments utilizing a laminate base layer with an adhesive component.

Paragraph [AJ]: The method according to Paragraphs [AH] to [AI], wherein the adhesive component is deposited substantially around an outer perimeter of the sacrificial polycarbonate layer and a corresponding outer perimeter of the first outer surface of the single-layered base layer in such embodiments or the first outer base layer in such embodiments utilizing a laminate base layer, wherein a center portion of the sacrificial polycarbonate layer and a corresponding center portion of the first outer surface of the single-layered base layer in such embodiments or the first outer base layer in such embodiments utilizing a laminate base layer are devoid of the adhesive component.

Paragraph [AK]: The method according to Paragraphs [AI] to [AJ], wherein the adhesive component defines an air-tight and water-tight seal between the sacrificial polycarbonate layer and the first outer surface of the single-layered base layer in such embodiments or the first outer base layer in such embodiments utilizing a laminate base layer.

Paragraph [AL]: The method according to Paragraphs [AI] to [AK], wherein the adhesive component comprises a silyl modified polymer.

Paragraph [AM]: The method according to Paragraph [AL], wherein the silyl modified polymer comprise a polyurethane.

Paragraph [AN]: The method according to Paragraph [AH], wherein the step of directly or indirectly attaching the sacrificial polycarbonate layer to the first outer surface of the single-layered base layer in such embodiments or the first outer base layer in such embodiments utilizing a laminate base layer comprises clamping the sacrificial polycarbonate layer to the base layer.

Paragraph [AO]: The method of Paragraphs [AH] to [AN], wherein the base layer comprises a total base layer thickness from about 0.25 inches to about 1.0 inches.

Paragraph [AP]: The method according to Paragraphs [AH] to [AN], wherein the base layer comprises a total base layer thickness from about 0.25 inches to about 0.75 inches.

Paragraph [AQ]: The method according to Paragraphs [AH] to [AP], wherein the base layer comprises a laminate base layer including a first outer base layer comprising a first outer base layer thickness, a second outer base layer comprising a second outer base layer thickness, and an interior base layer comprising an interior base layer thickness, wherein the first outer base layer thickness may be the same or different than the second outer base layer thickness and the interior base layer thickness being larger than the first outer base layer thickness and the second outer base layer thickness.

Paragraph [AR]: The method according to Paragraphs [AH] to [AS], wherein the interior base layer thickness comprise from about 30 percent to about 70 percent of the total laminate base layer thickness of the laminate base layer.

Paragraph [AS]: The method according to Paragraphs [AH] to [AT], wherein the interior base layer thickness comprise from about 40 percent to about 60 percent of the total laminate base layer thickness of the laminate base layer.

Paragraph [AT]: The method according to Paragraphs [AH] to [AS], wherein the sacrificial polycarbonate layer comprises a sacrificial polycarbonate layer thickness from about 0.15 inches to about 0.5 inches.

Paragraph [AU]: The method according to Paragraphs [AH] to [AT], wherein the sacrificial polycarbonate layer comprises a sacrificial polycarbonate layer thickness from about 0.25 inches to about 0.5 inches.

Paragraph [AV]: The method according to Paragraphs [AH] to [AU], wherein a thickness ratio between the sacrificial polycarbonate layer thickness to the total base layer thickness comprises from about 1:3 to about 1:5.

Paragraph [AW]: The method according to Paragraphs [AH] to [AV], wherein a thickness ratio between the sacrificial polycarbonate layer thickness to the total base layer thickness comprises from about 1:3.5 to about 1:4.

Paragraph [AX]: The method according to Paragraphs [AH] to [AW], further comprising a step of positioning the base layer and the sacrificial polycarbonate layer within a frame.

Paragraph [AY]: The method according to Paragraph [AX], wherein the frame comprises a picture frame structure having a bottom component, a first side component, a second side component and optionally a top component.

Paragraph [AZ]: The method according to Paragraph [AY], wherein the top component is releasably connected to the first side component, the second side component, or both.

Paragraph [AAA]: The method of any one of Paragraphs [AY] to [AZ], wherein first side component, the second side component, and the bottom component comprise a single unitary piece comprising a U-shaped structure.

Paragraph [AAB]: The method according to Paragraphs [AY] to [AAA], wherein each of the bottom component, the first side component, the second side component and the top component each independently comprise a generally U-shaped channel configured for receiving the base layer and the sacrificial polycarbonate layer.

Paragraph [AAC]: The method according to Paragraphs [AY] to [AAB], wherein bottom component comprises a generally U-shaped channel and a plurality of weep holes located at a bottom portion of the U-shaped channel of the bottom component.

Paragraph [AAD]: The method according to Paragraph [AAC], wherein the plurality of weep holes are configured to allow for water drainage.

Paragraph [AAE]: The method according to Paragraphs [AY] to [AAD], further comprising a step of positioning one or more setting blocks along the bottom component of the frame; wherein the one or more setting blocks contact a forward facing side of the sacrificial polycarbonate layer.

Paragraph [AAF]: The method according to Paragraph [AAE], wherein the setting blocks comprise a santoprene thermoplastic elastomer.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

What is claimed is:

1. A protective shield, comprising:

a first polycarbonate layer having a first surface coating and defining a first frit area in which the first surface coating is absent;

a sacrificial polycarbonate layer having a second surface coating and defining a second frit area in which the second surface coating is absent; and wherein the first frit area of the first polycarbonate layer is secured to the second frit area of the sacrificial polycarbonate layer such that an air gap is defined between the first polycarbonate layer and the second polycarbonate layer when so secured.

2. The protective shield of claim 1, wherein the first polycarbonate layer comprises a single-layered base layer.

3. The protective shield of claim 1, wherein the first polycarbonate layer comprises a laminate base layer including at least three individual transparent polycarbonate layers including:

a first outer base layer, a second outer base layer, and an interior base layer.

4. The protective shield of claim 3, wherein ripple orientations of each of the first outer base layer, second outer base layer, interior base layer, and sacrificial polycarbonate layer are oriented in a uniform direction.

5. The protective shield of claim 1, wherein an adhesive that secures the first polycarbonate layer to the sacrificial polycarbonate layer is located substantially around outer perimeters of the first and sacrificial polycarbonate layers, wherein center portions of the first and sacrificial polycarbonate layers are devoid of the adhesive.

6. The protective shield according to claim 3, wherein a ratio of thicknesses of the first outer base layer, the second outer base layer, and the interior base layer is about 1:1:2.

7. The protective shield according to claim 6, wherein a thickness ratio between the sacrificial polycarbonate layer and the first polycarbonate layer is about 1:3.

8. The protective shield according to claim 6, wherein a thickness ratio between the second polycarbonate layer and the first polycarbonate layer is about 1:5.

9. A vehicle, comprising:

an operating area configured for an individual to operate the vehicle; and a protective shield according to claim 1;

wherein the protective shield is releasably mounted on the vehicle.

10. A method of forming a protective shield, comprising:

providing a first polycarbonate layer having a first surface coating and defining a first frit area in which the first surface coating is absent;

providing a sacrificial polycarbonate layer having a second surface coating and defining a second frit area in which the second surface coating is absent;

attaching the first polycarbonate layer to the sacrificial layer via the first frit area and the second frit area to define an air gap between the first polycarbonate layer and the sacrificial polycarbonate layer.

11. The method of claim 10, wherein the first polycarbonate layer comprises a laminate base layer including at least three individual transparent polycarbonate layers including:

a first outer base layer;

a second outer base layer; and an interior base layer, wherein attaching the first polycarbonate layer to the sacrificial polycarbonate layer comprises aligning ripple orientations for the first outer base layer, the second outer base layer, the interior base layer, and the sacrificial polycarbonate layer in a uniform direction.

12. The method of claim 11, wherein the attaching the first polycarbonate layer to the sacrificial comprises aligning the ripple orientations for the first outer base layer, the second outer base layer, the interior base layer, and the sacrificial polycarbonate layer in a uniform direction.

13. The method of claim 11, wherein a ratio of thicknesses of the first outer base layer, the second outer base layer, and the interior base layer is about 1:1:2.

14. The method of claim 13, wherein a thickness ratio between the second polycarbonate layer and the first polycarbonate layer is about 1:3.

15. The method of claim 10, wherein the first polycarbonate layer consists of a single base layer with a thickness between 0.25 and 1.0 inches.

16. The method of claim 10, wherein the first polycarbonate layer comprises three base layers laminated together, wherein an inner layer of the three base layer has a thickness of about ¼ inches and is disposed between two outer layers of the three base layers that each has a thickness of about ⅛ inches.

17. The method of claim 10, wherein the sacrificial polycarbonate layer is defined with a thickness between about 0.1 inches to about 0.75 inches.

18. The method of claim 10, wherein the air gap is defined with a thickness between the first polycarbonate layer and the sacrificial polycarbonate layer of between about 1/32 to about 1.5 inches.

19. The method of claim 10, wherein the air gap is defined with a thickness ratio relative to the first polycarbonate layer and to the sacrificial polycarbonate layer of about 3:8:4.

20. The method of claim 10, wherein attaching the first polycarbonate layer to the sacrificial layer via the first frit area and the second frit area includes applying an adhesive to at least one of the first frit area and the second frit area.

21. The method of claim 20, further comprising, prior to applying the adhesive:

disposing a foam dam between the first polycarbonate layer and the sacrificial polycarbonate layer, wherein the adhesive is applied to an outer perimeter of the dam between the first polycarbonate layer and the sacrificial polycarbonate layer.

22. The method of claim 10, further comprising:

removing a portion of the first surface coating from the first polycarbonate layer to define the first frit area; and removing a portion of the second surface coating form the sacrificial polycarbonate layer to define the second frit area.

23. The protective shield of claim 1, wherein the first polycarbonate layer consists of a single base layer with a thickness between 0.25 and 1.0 inches.

24. The protective shield of claim 1, wherein the first polycarbonate layer comprises three base layers laminated together, wherein an inner layer of the three base layers has a thickness of about ¼ inches and is disposed between two outer layers of the three base layers that each has a thickness of about ⅛ inches.

25. The protective shield of claim 1, wherein the air gap is defined with a thickness between the first polycarbonate layer and the sacrificial polycarbonate layer of between about 1/32 to about 1.5 inches.

26. The protective shield of claim 1, wherein the air gap is defined with a thickness ratio relative to the first polycarbonate layer and to the sacrificial polycarbonate layer of about 3:8:4.

27. The protective shield of claim 5, further comprising:

a foam dam disposed between the adhesive and the air gap.

* * * * *